(12) United States Patent
Williams

(10) Patent No.: US 9,777,707 B2
(45) Date of Patent: Oct. 3, 2017

(54) WINDMILL THAT GENERATES EXCEPTIONAL AMOUNTS OF ELECTRICITY

(71) Applicant: Darell Allen Williams, California City, CA (US)

(72) Inventor: Darell Allen Williams, California City, CA (US)

( * ) Notice: Subject to any disclaimer, the term of this patent is extended or adjusted under 35 U.S.C. 154(b) by 66 days.

(21) Appl. No.: 14/791,274

(22) Filed: Jul. 3, 2015

(65) Prior Publication Data

US 2017/0002794 A1    Jan. 5, 2017

(51) Int. Cl.
| F03D 7/02 | (2006.01) |
| F03D 1/06 | (2006.01) |
| F03D 9/00 | (2016.01) |
| F03D 15/00 | (2016.01) |
| F03D 9/28 | (2016.01) |
| F03D 1/04 | (2006.01) |

(52) U.S. Cl.
CPC ............ *F03D 7/0204* (2013.01); *F03D 1/04* (2013.01); *F03D 1/0666* (2013.01); *F03D 1/0675* (2013.01); *F03D 7/022* (2013.01); *F03D 7/028* (2013.01); *F03D 9/008* (2013.01); *F03D 9/28* (2016.05); *F03D 15/00* (2016.05); *F05B 2240/31* (2013.01); *F05B 2240/313* (2013.01); *Y02E 10/721* (2013.01); *Y02E 10/722* (2013.01); *Y02E 10/723* (2013.01)

(58) Field of Classification Search
CPC ...... F03D 1/0675; F03D 7/0204; F03D 7/022; F03D 7/028; F03D 9/001; F03D 9/002; F03D 9/008; F03D 15/00; F03D 17/00
See application file for complete search history.

(56) References Cited

U.S. PATENT DOCUMENTS

| 925,063 | A | * | 6/1909 | White ........................ 416/117 |
| 2,006,024 | A | * | 6/1935 | Lockwood ............. F03D 3/067 416/110 |
| 3,883,750 | A | * | 5/1975 | Uzzell, Jr. ................ F03D 1/04 290/44 |
| 3,920,354 | A | * | 11/1975 | Decker ................... F03D 3/067 416/117 |
| 4,213,734 | A | * | 7/1980 | Lagg ..................... F03B 17/061 415/3.1 |
| 4,309,146 | A | * | 1/1982 | Hein ........................ F03D 1/04 415/4.2 |
| 5,202,672 | A | | 4/1993 | Nakamura et al. |
| 6,179,563 | B1 | * | 1/2001 | Minchey ................ F03D 3/067 415/4.2 |

(Continued)

*Primary Examiner* — Joshua Rodden
(74) *Attorney, Agent, or Firm* — KSIP; Kelsey M. Stout

(57) ABSTRACT

A windmill for generating electricity is described, which contains several improvements that enable the blades of the windmill to be much wider than conventional electricity-generating windmill blades. The rotor containing the blades will also change direction to capture the largest amount of wind energy available. The windmill includes a "shroud" surrounding the blades, which increases the wind velocity through the blades. Support structures for the windmill are described, and also a method of using the windmill to store electricity to use later is shown. The windmill is more stable than conventional windmills. A method of using a windmill to generate electricity is also described.

20 Claims, 9 Drawing Sheets

(56) References Cited

U.S. PATENT DOCUMENTS

| | | | |
|---|---|---|---|
| 6,246,126 B1* | 6/2001 | Van Der Veken | F03D 1/04 290/44 |
| 6,710,468 B1* | 3/2004 | Marrero O'Shanahan | F03D 1/04 290/44 |
| 6,734,576 B2* | 5/2004 | Pacheco | B60K 16/00 290/53 |
| 7,821,164 B2 | 10/2010 | Laskaris et al. | |
| 7,939,958 B2 | 5/2011 | Todorof | |
| 8,148,841 B1 | 4/2012 | Apthorp | |
| 8,257,019 B2* | 9/2012 | Cironi | F03D 1/04 415/126 |
| 8,269,369 B2 | 9/2012 | Todorof | |
| 8,282,353 B2 | 10/2012 | Russ | |
| 8,338,979 B2 | 12/2012 | Bray | |
| 8,403,786 B2 | 3/2013 | Bech | |
| 8,459,872 B2 | 6/2013 | Nies | |
| 8,502,403 B2 | 8/2013 | Merswolke et al. | |
| 8,585,367 B2 | 11/2013 | Bech | |
| 8,702,393 B2* | 4/2014 | Al-Azzawi | F03D 3/068 416/132 A |
| 2005/0002783 A1* | 1/2005 | Hiel | F03D 1/04 415/208.1 |
| 2006/0151664 A1* | 7/2006 | Yu | B63H 13/00 244/4 R |
| 2010/0264663 A1* | 10/2010 | Barber | F03D 1/02 290/55 |
| 2012/0292912 A1 | 11/2012 | Haskell | |
| 2013/0216381 A1 | 8/2013 | Liu | |
| 2014/0255151 A1* | 9/2014 | Jensen | F03D 1/04 415/4.3 |
| 2014/0265344 A1* | 9/2014 | Barber | F03D 11/02 290/55 |
| 2015/0108758 A1* | 4/2015 | Oakes | F03D 3/0427 290/52 |

* cited by examiner

WINDMILL THAT GENERATES EXCEPTIONAL AMOUNTS OF ELECTRICITY

REFERENCES CITED

U.S. PATENT DOCUMENTS

| DOCUMENT | DATE FILED | AUTHOR(S) |
|---|---|---|
| 5,202,672 | May 1992 | Nakamura, et. al. |
| 7,821,164 | February 2007 | Laskaris et. al. |
| 7,939,958 B2 | May 2008 | Todorof |
| 8,148,841 | November 2008 | Apthorp |
| 8,257,019 B2 | October 2010 | Cironi |
| 8,269,369 B2 | March 2011 | Todoroff |
| 8,282,353 | June 2006 | Russ et. al. |
| 8,338,979 | June 2011 | Bray |
| 8,403,786 | July 2009 | Bech |
| 8,459,872 B2 | October 2008 | Nies, et. al. |
| 8,502,403 B2 | January 2008 | Merswolke, et. al. |
| 8,585,367 | July 2009 | Bech |
| US2012/0292912 A1 | March 2008 | Haskell |
| US2013/0216381 A1 | June 2011 | Liu |

DESCRIPTION OF RELATED ART

Windmills which generate electricity by harnessing wind power have existed for several decades. Existing designs generate electrical power, but the cost of this power has generally been uncompetitive with electricity generated by burning fossil fuels. Electricity generated through wind power usually costs more than twelve cents per kilowatt-hour, on a wholesale basis. Electricity generated by burning fossil fuels, by contrast, costs around 8 cents per hour. Inventors have therefore tried to create electricity-generating windmills that can generate a larger amount of electrical energy from the same amount of wind energy. Other inventors have attempted to create electricity-generating windmills with parts in configurations that are different from electricity-generating windmills of the standard design.

The following references represent advances in the art, but none of these references incorporate all the features of the present invention, as explained below. The features of the present invention are organized in a way that generates a superior amount of electrical energy from the same amount of wind energy.

This also distinguishes the present invention from all inventions of the prior art. Many inventions of the prior art were also created for completely different purposes from the present invention, and therefore would have no reason to incorporate the features of the present invention.

Bech describes a wind-powered turbine with an improved drive train in U.S. Pat. No. 8,403,786. This turbine includes improvements over turbines of the previous design, but Bech's turbine does not include many of the improved features of the present invention, such as the ability to support the turbine from above, and the ability to move the windmill connected to the turbine to catch the greatest amount of wind, and the "shroud" which increases the amount of wind energy which is funneled through the windmill so that it eventually reaches the turbine.

Bech describes another wind-powered turbine with an improved drive train in U.S. Pat. No. 8,585,367. The main bearing unit of this turbine has multiple rings. However, this invention does not include the ability to support the turbine from above, and the ability to move the windmill connected to the turbine to catch the greatest amount of wind, and the "shroud" which increases the amount of wind energy which is funneled through windmill and eventually reaches the turbine.

Laskaris, et. al. describe, in U.S. Pat. No. 7,821,164, a generator with superconducting components, which can be attached to a wind-powered turbine. They claim the generator, and certain associated methods, as their invention, and also claim that the generator they have described is more successful at generating power from wind-driven turbines than previous models. However, the electricity-generating windmill which they describe is conventional and lacks many of the improved features of the present invention, such as the ability to support the windmill and turbine from above, and the ability to move and configure the blades of the rotors to catch the greatest amount of wind, and the "shroud" which increases the amount of wind energy which is funneled through windmill and ultimately reaches the turbine. The present invention is therefore based on different principles from Laskaris' invention, and represents different types of improvement over previous windmills that generate electricity.

In U.S. Pat. No. 8,338,979, Bray et. al. describe another generator with superconducting components, which can be attached to a wind-powered turbine. This has certain improvements over the Laskaris patent, and they also claim the generator, and certain associated methods, as their invention. Bray describes an electricity-generating windmill which lacks many of the improved features of the present invention, such as the ability to support the turbine from above, and the ability to move the blades to catch the greatest amount of wind, and the "shroud" which increases the amount of wind energy which is funneled through the turbine.

Todoroff describes, in U.S. Pat. No. 7,939,958, an electricity-generating windmill which includes the ability to change the angle of the rotor blades to catch the maximum amount of wind energy. However, the invention of Todoroff does not include the ability for the turbine to be supported from above, and the angle of the blades of Todoroff's turbine is changed through a different method from the way that the rotor is moved in the present invention. The present invention includes cables, attached to each of the blades of the rotor. The blades are also divided into sections. The present invention has the ability to position each section of each blade to catch the optimal amount of wind energy. Todoroff's invention does not include this capability.

Todoroff also does not include the shroud, which maximizes the amount of wind energy flowing through the rotor. The wind turbine of the present invention is also adjustable for height, which is a feature lacking in Todoroff.

In U.S. Pat. No. 8,269,369 B2, Todoroff describes an electricity-generating windmill with a gearless assembly. This invention, too, does not include the ability for the windmill to be supported from above, and the angle of the blades of the rotor of Todoroff's windmill is changed through a different method from the way that the blades of the rotor are angled in the present invention. Todoroff also does not include the shroud, which maximizes the amount of wind energy flowing through the rotor. The wind turbine of the present invention is also adjustable for height, which is a feature lacking in Todoroff.

Russ et. al. describe a bearing unit for rotor blades, which can be used to absorb the force that wind pressure may exert upon the rotor and blades of a windmill. However, Russ' invention speaks to a bearing unit, not to a windmill that generates electricity, and therefore lacks many of the improved features of the present invention, such as the ability to support the rotor from above, and the ability to move the sections of the blades to catch the greatest amount of wind, and the "shroud" which increases the amount of wind energy which is funneled through the turbine.

Apthorp discloses, in U.S. Pat. No. 8,148,841, a modular windmill system with stacked groups of blades. The stacked configuration of the blades in Apthorp's invention is very different from the configuration of the blades in the present invention, and operates on different principles. Apthorp's invention does not include many of the features of the present invention, such as the ability to support the turbine from above, and the ability to move the blades to catch the greatest amount of wind, and the "shroud" which increases the amount of wind energy which is funneled through the turbine. In fact, Apthorp teaches away from these innovations. Apthorp also does not include the connection of the windmill to a reservoir of water, which is part of the present invention.

Cironi describes, in U.S. Pat. No. 8,257,019 B2, an electricity-generating windmill with a shroud. The shroud is adapted to direct wind energy to the rotor. However, the support structures for the windmills described in Cironi are made of concrete, which is very different from the support structures of the present invention (See FIG. IOB of Cironi). The support structures in Cironi support the wind turbines from below, like the support structures for all electricity generating windmills of the prior art. The support structures of the present invention support the invention from above, or consist of cables that support the angle of attack, or struts in certain embodiments. Cironi also does not describe the ability to connect the turbine to a reservoir of water or other secondary power reserve.

In U.S. Pat. No. 8,459,872, Nies, et. al. describe a bearing for use with windmills that generate electricity. This is different from the present invention, which is focused on the windmills themselves, and structural elements supporting them. Furthermore, Nies teaches away from the present invention, which can be seen because Nies shows a conventional electricity-generating windmill in FIG. 1 of Nies.

Merswolke, et. al., describe in U.S. Pat. No. 8,502,403 a windmill which generates electricity, which is connected to multiple generators. However, the windmill itself is conventional, and does not possess several important features of the present invention. These features include the present invention's ability to support the rotor from above, and the ability to move the sections of the windmill blades to catch the greatest amount of wind energy, and the "shroud" which increases the amount of wind energy which is funneled through the rotor. Merswolke also does not include the ability to connect the windmill to a reservoir of water or other secondary power reserve.

Haskell describes, in patent application US2012/0292912 A1, a small wind-powered generator that can be placed near roadways and can generate electricity, based on wind created by the automobiles, or natural wind. This energy can then be stored. However, Haskell's invention does not include a means of storing the electrical power. Furthermore, Haskell's invention does not possess many features of the present invention, including the ability to support the rotor from above, and the ability to move the sections of the blades to catch the greatest amount of wind energy, and the "shroud" which increases the amount of wind energy which is funneled through the rotor. The present invention also includes different components, and operates upon different principles, from Todoroff's invention.

Application US2013/0216381 A1, by Liu, describes a turbine designed to be powered by fluid oscillation. This is very different from the claimed invention, because it involves generating electricity from the kinetic energy of fluid, not air. Fluid has several characteristics that air does not have, such as cavitation. Air also has several characteristics that fluid does not have. For example, Boyle's law applies to air but does not apply to fluid. Furthermore, the design of the turbine in Liu works on fluid oscillation, which is a different physical phenomenon from the wind energy which powers the present invention. Liu's patent application also does not discuss the possibility of supporting the rotor from above, and the ability to move the sections of the blades to catch the greatest amount of wind, and the "shroud" which increases the amount of wind energy which is funneled through the rotor. These are all part of the present invention.

Apthorp, at col. 2, lines 30-45, says "It has long been thought that substantial performance advantages could be realized by the use of a shroud and diffuser on a wind turbine", but that "Many groups have become interested in diffuser-augmented windmills, but they have always dropped the idea because the diffuser had to be so much larger than the windmill rotor that the system has heretofore been considered economically impractical." Therefore, Apthorp taught away from the idea of the shroud which is part of the present invention.

Apthorp, Col. 2, line 65-Col. 3, line 30, notes that windmills of the prior art are highly vulnerable to stress from the windmill or other supporting structure during high wind speeds. Apthorp also indicates that prior art windmills had (at that time) been primarily built by placing the rotors on top of very tall towers, that this made the windmills vulnerable to bending in high winds, and that this problem could not be alleviated by guidewires or struts because the rotating windmill blades would get in the way. The present invention solves all these problems.

None of these inventions discussed here include the ability of a windmill to be supported from above, which allows the windmill to be scalable and to be much larger than windmills that are only supported by a post. None of the inventions also include the additional feature of connecting the wind-powered turbine to a water reservoir, to create a "reserve" which can be used to generate hydroelectric power when there is insufficient wind energy available to supply the needs of the grid.

SUMMARY OF INVENTION

The present invention relates to the field of windmills for generating electrical power. The invention contains several improvements over the prior art, which enable it to extract a much larger amounts of electricity, from the same amount of wind energy, than previous electricity-generating windmills. Each of the improvements further increases the invention's capacity to generate power. Several embodiments are discussed below.

Much of the electrical power generated in the world today is generated through power plants which burn fossil fuels, namely oil, coal, and natural gas. The Earth's supply of fossil fuels is finite, and, in addition, combustion of fossil fuels has other drawbacks, such as emissions of carbon dioxide and particulate matter. These problems have become more urgent in recent years, because of the increase in oil prices, and because of mounting global concern about greenhouse gas emissions.

Utilities and individuals have launched an effort to create other, less polluting ways of generating electricity. "Renewable" sources of electrical power include wind power, solar power, and other sources. Wind power is generally harnessed through windmills that generate electricity. When the wind blows, it causes the rotor blades of the windmill to turn, which drives a turbine, which is connected with one or more generators, which generate electricity.

General Principles Governing the Amount of Electricity Generated by a Windmill

There is a strong positive correlation between the amount of wind energy captured by the windmill and the amount of electrical power which can be generated by the generators connected with the windmill, for any given electricity-generating windmill. Therefore, the more wind energy is captured by the windmill, the more electricity the generators connected with the windmill will be able to generate, until the generators reach their maximum capacity. The general rule is that a portion of the energy contained within the wind is captured when it hits the blades, which are less than 100% efficient. A portion of the energy captured by the blades then goes to the turbine, which is also less than 100% efficient. Finally a portion of the energy which reaches the turbine then is transmitted to the generators, which are also less than 100% efficient. The generators then generate electricity.

The speed at which the wind is blowing is proportional to the energy within the wind, and therefore, more electrical energy can theoretically be generated from wind traveling at faster speeds.

The equation governing the kinetic energy of the wind hitting a wind-powered turbine's blades is $$ke = \frac{1}{2}mv^2$$

where ke=kinetic energy, m=mass and v=velocity.

Thus, absent other considerations, a twofold increase in the wind speed of wind hitting the blades of a rotor of a windmill will result in a fourfold increase in the amount of wind energy imparted to the blades of that windmill.

The power output of an electricity-generating windmill is also directly related to the windmill's total blade area. A twofold increase in the total surface area of the blades will result in a twofold increase in the amount of wind hitting the blades, and therefore, will result in a twofold increase of the amount of wind energy imparted to the blades of that windmill, if all other factors are equal.

Other factors may vary, which will cause some variation in the increased amount of power that a windmill actually generates in the above scenarios. For example, each blade sometimes creates a small amount of turbulence in the air, which may affect the amount of electricity generated by the other blades of the windmill. However, the above rules are useful guidelines for calculating the amount of electrical energy that a given windmill has the ability to produce;

Therefore, as a general rule, a windmill will generate more energy if it utilizes higher-speed winds, and will also generate more energy if it has wider blades. The capacity of the turbines and generator connected to the windmill are also relevant factors. Larger numbers of generators, and higher-capacity generators, will be able to convert a greater amount of kinetic energy to electrical energy.

Another limitation of electricity-generating windmills of the prior art is that the generator(s) are placed at or near the conventional center (5) of a prior art electricity-generating windmill. This limits the size of the generator(s) which can be included as part of a prior art electricity-generating windmill, because more and/or larger generators are heavier. Therefore, when placed at or near the conventional center (5), they will make the conventional windmill (4) less stable, and will increase the risk of the conventional windmill (4) collapsing or falling over in high winds. The ability of conventional windmills (4) to create electrical energy is therefore limited by the lack of generators to utilize the energy carried by the wind power hitting the conventional windmills' (4) blades. The present invention solves this problem by allowing the generators to be placed at ground level, or below ground. Therefore, the number, size, capacity of such generators can be increased indefinitely, as needed. The stability of the machine of the present invention will not be affected by this.

The Venturi Effect and its Relevance to Wind Power

The Venturi Effect has been known since 1797. The Venturi Effect is that, as a fluid passes through a constricted tube, the fluid's velocity must increase, and its pressure must decrease.

The equation governing this is as follows:

$$p_1 - p_2 = d/2((v_2)^2 - (v_1)^2)$$

Where $p_1$ is the fluid pressure at the wider opening, $p_2$ is the fluid pressure at the narrower opening, d is the density of the fluid, $v_2$ is the fluid velocity when the pipe is narrower, and $v_1$ is the fluid velocity when the pipe is wider.

The Venturi effect can be used to increase the speed of a boat or other watercraft, which is connected to a constricted tube, because of the increase in velocity and decrease in pressure of the water as it passes through the tube. Some hydrofoil boats use the Venturi effect to increase their speed.

An effect similar to the Venturi effect applies to air and other gases, in that as a gas passes through a constricted tube, where the tube is narrower at some points than others, the gas's velocity must increase, and its pressure must decrease, at the narrower points.

This has important implications for the ability of windmills to generate electricity. If the wind passing through a windmill's blades has a higher velocity, then the kinetic energy hitting the windmill's blades will be higher, as noted above. The windmill will therefore be able to generate more electricity, as explained above. Some embodiments of the present invention employ a "shroud" with openings that are wider than the diameter of the blade rotors. This shroud constricts the air as it passes through the windmill's rotors, and increases the velocity of that air. This then increases the energy of the wind passing through the rotors, enabling the windmill to ultimately generate more electricity.

Other embodiments of the present invention shape the shroud like a nozzle, which also constricts the air as it passes through the windmill's rotors, increasing the kinetic energy of that air, which then hits the blades, enabling the windmill to ultimately generate more electricity.

Still other embodiments of the present invention use a lightweight, thin, metal nozzle to constrict the air as it passes through the rotors.

Generating Capacity

The capacity of the generators associated with an electricity-generating windmill is a potentially limiting factor in the windmill's ability to generate electricity. Therefore, a windmill which is attached to more or larger generators will have a greater capacity to produce electricity. The amount of electricity produced by the windmill will, of course, be a function of the amount of energy which reaches the generators, which is partially governed by the factors discussed above. The electricity-generating machine of the present invention is designed with the generators near ground level. This is important, because the machine of the present invention can accommodate more and larger generators than windmills of the prior art.

Current Electricity-Generating Windmills

Prior art electricity-generating windmills have several drawbacks which reduce their usefulness. Most electricity-generating windmills cannot produce electricity cheaply enough to compete with electricity generated by fossil fuels. This is true even though oil and natural gas prices have increased. Therefore, most commercial wind-powered electrical generation systems need to be subsidized. In California, such subsidies are scheduled to decrease, reducing the profitability of commercial wind-powered electrical generation systems. Wind-powered electrical generation systems that could produce electricity at the same cost, or a lower cost, than presently available wind-powered systems would therefore be extremely useful to the wind power industry.

Prior art electricity-generating windmills also are only able to capture a small portion of the wind energy passing through them. Some of the reasons for this are explained below.

The blades of electricity-generating windmills turn in a circle, so it will be useful to think of the area within a complete rotation covered by the blades of a windmill, as they turn, as 360 degrees. The area of a blade can be seen in terms of the number of "degrees" within a 360-degree turn that the blade covers. For example, a blade which covers 4 degrees would cover 4/90 of the total area embraced by the blades as they turn. A blade which covers 1 degree would cover 1/360 of the total area embraced by the blades as they turn.

Electricity-generating windmills of the prior art generally include three blades, which each cover 2.5 to 3 degrees. Therefore, the total area embraced by the blades amounts to the equivalent of 7.5 to 9 degrees, or, at most 1/40 of the complete area of the circle covered by the blades as they turn.

The narrower blades, especially at their outer edges, capture less of the wind energy passing through the windmill than wider blades would capture. This is because wider blades would be hit by a larger portion of the wind passing through the windmill. In other words, a conventional windmill (4) of the prior art, with 3 blades covering 3 degrees each, would cover 9 degrees of the area embraced by the blades as they rotate. It would be able to capture 9/360, or 1/40 of the kinetic energy of the wind passing through this area. An explanation of this is illustrated by FIG. 1. The conventional post (1) holds up the conventional windmill (4) comprising the conventional rotor (3). The rotor, in turn, includes the conventional blades (2) and the conventional center (5). As wind blows, the wind hits the conventional blades (2). The wind energy hitting the conventional blades (2) causes the conventional blades (2) to turn. This, in turn, powers a turbine, which powers a conventional generator (6). There are only three conventional blades (2), and they each embrace, at most, 3 degrees. The design of windmills of the prior art requires that the conventional generator (6) be placed on top of the conventional pole (1). This typical conventional generator (6) usually weighs more than 400,000 pounds. This limits the potential weight of the conventional blades (2) and increases the potential instability of windmills of the present design in winds above 29 mph.

A larger weight on top of the conventional pole (1) makes the conventional pole (1) less stable. Conventional generators (6) are a large weight. More or larger generators are required to generate larger amounts of electricity, as discussed above. Therefore, the capacity of a windmill to produce electricity will eventually be limited by the total capacity of the generators that it is attached to. Electricity generating windmills of the prior art have the conventional generator (6) on top of the pole (1). Electricity-generating windmills of the prior art are limited in the size and number of the conventional generators (6) that they are attached to, because the large weight of the conventional generator (6) on top of the conventional pole makes the conventional pole (1) less stable, and create a large risk of components flying off the conventional poles (1) in winds above 29 mph.

The current invention solves this difficulty by placing the generators near ground level. The current invention can therefore include much larger and more numerous generators than electricity-generating windmills of the prior art. This increases the current invention's ability to generate electricity.

Electricity-generating windmills of the prior art generally use three narrow blades because their design, with both the conventional rotor (3) and the conventional generator (6) on top of the conventional post (1) does not allow for a larger number of conventional blades (2). Most of the problems discussed below would also be present in an electricity generating windmill of the current prior art, which had more than three conventional blades (2) on the conventional rotor (3). In other words, the presence of more conventional blades (2) would have no effect on these problems in an electricity-generating windmill of the prior art.

More Information about Safety Risks of Prior Art Electricity Generating Windmills The currently prevalent electricity-generating windmill design, which lacks several features of the present invention, cannot operate safely in winds above 50 mph. Electricity-generating windmills of the currently prevalent design will turn their blades parallel to the wind in speeds above 50 mph. Winds above 29 mph create a risk that the conventional blades (2) will fly off the conventional rotor (3), which is a safety hazard. The conventional blades (2) will usually weigh more than 33,000 pounds each, and are big enough that one of them could easily kill a bystander whom it hits. The electricity-generating windmills of the prior art therefore becomes unstable at wind speeds above 29 mph, and must therefore be shut off at wind speeds above 50 mph. All wind energy which might pass through the conventional rotor (3) is wasted at wind speeds above 50 mph. This is doubly unfortunate, because the amount of wind energy passing through a rotor increases in geometric proportion to the speed of the wind, as noted above. Therefore, electricity-generating windmills of the prior art are unable to generate electricity at the precise time when the greatest amount of wind energy is available. Todoroff noted this problem, and stated that "It is well-known that in the art of wind turbines that the blade assembly can experience catastrophic force from excessive or high-velocity winds" in U.S. Pat. No. 8,269,369 82.

Current electricity-generating windmills also do not take maximum advantage of the amount of wind energy passing through them because their conventional rotors (3) and conventional blades (2) are generally fixed to only face in one direction. Thus, if the direction that the wind is blowing varies, a conventional electricity-powered windmill cannot move to "catch" the wind and utilize the maximum amount of wind energy. If the wind is blowing at an angle perpendicular to the direction that the conventional rotors (2) and conventional blades (3) are facing, then an electricity-generating windmill of the current design may be unable to catch and use most of the kinetic energy carried by the wind.

This situation is illustrated by FIG. 2, where the direction of wind is indicated, blowing in a perpendicular manner to the conventional blades (2) of a windmill of the prior art.

These drawbacks exacerbate problems with the reliability of the amount of power generated by current electricity-generating windmills. Current electricity-generating windmills can only generate electrical power when wind is blowing through the rotor at the correct angle, and within a certain range of wind speeds. Therefore, when the wind is blowing at a different angle and/or not blowing within a specific range of speeds, electricity-generating windmills are generating less power, which decreases the amount of electricity available to the power grid. This missing electricity must be "made up" from other electrical generation sources, which increases the cost of electricity generated through wind power.

Electricity-generating windmills of the prior art also create a migratory hazard for birds. The tips of the rotor blades of the prior art windmills move at speeds of up to 180 mph. Because the prior art rotors are located far off the ground, the rotor blades are a hazard for birds. This is also shown by FIG. 1, where a bird is indicated. Many areas have passed regulations prohibiting electricity-generating windmills from being deployed in areas where they might become hazardous to large numbers of birds. This limits the number of electricity-generating windmills of the current design that can potentially be built.

This problem is magnified by the fact that electricity-generating windmills of the prior art have generally been built in large groups, located in areas with lower human populations. Conventionally designed electricity-generating windmills each require land in which the conventional pole (1) is planted. The windmill is generally built in a specific location, and is immovable. Unlike the present invention, conventional electricity-generating windmills are usually not designed to be placed on top of, or within, buildings.

The Present Invention

The electricity-generating machine of the present invention solves all of these problems. The solutions to the different problems will be described below. For purposes of this patent application, the blades of the electricity-generating windmill of the present invention will be called "partitioned blades" (15) because each blade has smaller partitions, or sub-sections. The "angle of attack" of the partitioned blades (15) will be the angle to which the partitioned blades (15) are turned to face, so that they can capture the largest amount of wind energy. The present invention contains many innovations, which give the invention greater strength and durability, and help the present invention to generate more power.

These innovations, some of which are present in different embodiments of the invention, include, but are not limited to, 1. A "shroud" made of lightweight material, which channels wind, to increase the kinetic energy of the wind that hits the partitioned blades (15). 2. A "rigid nozzle" (85), that funnels wind, to increase the kinetic energy of the wind that hits the partitioned blades (15), and which is preferably made of either metal or a ceramic substance sprayed onto cloth, which would produce rigidity. 3. The invention is designed with the generators, here called the primary generators (25), near ground level, which means that the primary generators do not decrease the invention's stability. Therefore, the invention can include many more and larger primary generators than electricity-generating windmills of the prior art. 4. The partitioned blades (15) of the windmill of the invention are "partitioned" into smaller sections, and each individual section is capable of moving on its own "angle of attack" to intercept and catch the maximum amount of wind. Therefore, the shape of each of the partitioned blades (15) can be changed so that, at each wind speed, all of the individual sections across the length of the partitioned blade (15) can be positioned with the optimal angle of attack for that wind speed. 5. The invention has strong supporting structures, which enable it to hold together and stay functional during high winds above 50 mph, so that it can continue generating electricity in winds above 50 mph.

These supporting structures are positioned and designed in such a way as not to interfere with the invention's capacity to capture wind energy. 6. The supporting structures of the invention allow it to be turned to face the direction from which the wind is blowing, so as to capture the largest amount of wind energy possible, which can then be turned to electrical energy. 7. The partitioned blades (15) of the present invention are wider than those of electricity-generating windmills of the prior art. They can be as wide as 30 degrees each. This is possible because of the large number of structures either directly or indirectly supporting the partitioned blades (15). 8. The present electricity-generating windmill contains at least four partitioned blades (15), which is more than the three-blade electricity-generating windmills of the prior art. This is also possible because of the large number of structures either directly or indirectly supporting the partitioned blades (15). 9.

Some embodiments of the invention can store electrical energy, when it is not needed, by pumping water into a reservoir. The water comes out of the reservoir, and is used to generate hydroelectric power, when there is a need for this stored electrical energy to be used. 10. The present invention is supported from above by the structures which are attached to it, which means that the present invention can generally be placed in more areas than inventions of the prior art. 11. The structure of the present invention makes it more durable, in general, than windmills of the prior art, more able to undergo stress, and less prone to accidents during storms. 12. A "blade connection cable" (59) connects all of the blade tips (58), providing additional structural support to the invention and helping the invention to function in high winds. This allows the present invention to be placed in many areas individually where conventional windmills cannot be placed. For example, the machine of the present invention could be placed inside of an opening in a building. This is impossible for windmills of the prior art.

The different innovations, which are present in the present invention, reinforce each other and increase the invention's capabilities. The fact that the invention is partially supported from above means that the partitioned blades (15) can be turned more easily to face the wind. An embodiment of the invention is supported from above, and also has two groups of poles attached, which can help move the partitioned blades (15) to face the direction of greatest wind.

This maximizes the amount of wind that passes through the partitioned blades (15), and therefore the amount of electrical energy generated by the invention.

Another embodiment of the invention includes a "shroud" which is placed around the windmill. This shroud, made of a lightweight material, focuses the wind flowing through the windmill rotors, and increases the amount of wind energy that passes through the windmill by up to 400%, depending on the size and shape of the shroud.

Still another embodiment of the present invention includes a lightweight rigid nozzle (85), that is fitted around the windmill (16) and helps to focus the wind energy within the invention, so that the wind energy going through the windmill (16) and hitting the partitioned blades (15) has higher velocity, which results in more kinetic energy being imparted to the partitioned blades (15). This means that the invention will generate more electricity.

Alternatively, the shroud can be given the form of a nozzle, in a nozzle-shaped shroud (100) which will also help to focus the wind energy within the invention, helping it to generate more electricity.

The combination of the shroud or nozzle, the increased width and number of the blades, the fact that the invention can remain functional in winds of any speed and does not need to shut down in winds of more than 50 mph, the ability of the partitioned blades (15) to turn to "catch" the maximum amount of wind energy, and of the individual blade sub-sections (17) to move to each catch the maximum amount of wind energy available to that section, and the fact that the primary generators of the present invention are near ground level, enables the machine of the current invention to generate 10-25 more electrical energy than a windmill of the prior art, with blades of the same length. Each of the innovations listed above increases the amount of electrical energy which the invention can generate, and the combination of these innovations generates vastly more electrical energy, with blades of the same length, than electricity generating windmills of the prior art.

TERM NUMBERS

The following numbers will refer to different terms throughout this patent application. A section is included for term numbers here, for ease of reference. (1) Conventional pole. (2) Conventional rotor. (3) Conventional blade. (4) Conventional windmill. (5) Conventional center. (6) Conventional generator. (10) Turbine blade area. (11) Pedestal. (14) Raceway. (15) Partitioned blade. (16) Windmill. (17) Blade sub-section. (18) Rib. (19) Blade spar. (20). Semi-flexible foam. (21). Flexible epoxy coating. (22) Coordination cables. (23) Blade coordination motors. (25) Primary generator. (26) Pedestal base. (27) Rotating power transfer sleeve. (39) Rotor. Rotating brackets. Tower brackets. Straight upper support beams. Top support. (44) Lower raceway holding post. (45) Upper raceway holding post. (50) Raceway support cables. (51) Raceway support strut. (52) Turbine shaft back end. (53) Main turbine shaft. (54) Turbine shaft crown. (55) Rotor assembly sleeve. (57) Counterweight. (58) Blade tips. (59) Blade connection cable. (61) Turbine shaft front end. Stilt. External support array. Pillar. Cornerstone knob. (67) Shroud. (68) Shroud unfurling strut. Pump. Reservoir. Hydroelectric device. (72) Lower pedestal support pole. (76) Intersection node. (80) Direction control motor. (81) Bearing. (85) Rigid nozzle. (86) Blade spar struts. Buttress knob. (92) Blade coordination power generator. Footing. (100) Nozzle-shaped shroud. (105) Nozzle-shaped shroud strut. (110) Lower bearing. (112) Upper scaffolding. (114) Support tower. (115) Control gear. Direction control motor 90 degree gear.

The First Embodiment

The Structure and Control of the Partitioned Blades

Each of the partitioned blades (15) of the windmill of the present invention includes at least four blade sub-sections (17). Each partitioned blade (15) will have a blade spar (19) which runs through the center of the partitioned blade (15) and along its length. Multiple ribs (18) which rotate around the blade spar (19) will project from the blade spar (19). Each blade sub-section (17) of each partitioned blade (15) is connected to at least one rib (18), and by the rib (18) to the blade spar (19). The ribs (18) each extend from the blade spar (19) to the edge of the partitioned blade (15). Semi-flexible foam (20) covered by a flexible epoxy coating (21) will be on the ribs (18), so as to make it easier for the blade sub-sections (17) to move relative to each other, and relative to the ribs (18). This semi-flexible foam (20) covered by a flexible epoxy coating (21) may also be on the blade spar (18) to make it easier for the ribs (18) to rotate around the blade spar. A nylon bearing may be mounted between the blade spar (18) and the individual blade sub sections (17) for rotational purposes.

"Coordination cables" (22) will run both from sides of each rib (18) to a group of at least 10 "blade coordination motors" (23), which are electric motors that control the coordination cables (22) and can move, or partially extend or retract them. By moving the coordination cables (22), which in turn control the positioning of the ribs (18), the blade coordination motors (23) control the positioning of the ribs (18), and thus partly control the positioning of the blade sub-sections (17). The blade coordination motors (23) are also within the turbine shaft back end (52). The coordination cables (22) stretch outward from the turbine shaft back end (52) to the partitioned blades (15). The blade spar (19) controls each of the partitioned blades (15), and allows each of the partitioned blades (15) to be positioned in a manner to "catch" the largest amount of wind energy possible. The combination of the ribs (18) and the coordination cables (22) also allows the blade sub-sections (17) of each partitioned blade (15) to vary 22 their positions to intercept and "catch" the largest amount of wind energy. The movements of the blade sub-sections (17) of each partitioned blade (15) will be controlled by at least IO blade coordination motors (23). Each blade coordination motor (23) will control two coordination cables (22), which will rotate the blade sub-sections (17).

In this manner, the blade coordination motors (23) can control the blade sub-sections (17) of each partitioned blade (15) precisely, and can position each of the blade sub-sections (17) so that it catches the maximum amount of wind energy. The position of each blade sub-section (17) which captures the maximum possible amount of wind energy for that blade sub-section (17) would also be the optimal "angle of attack" for the blade sub-section (17). This "angle of attack" may vary, depending on conditions, which is why the blade sub-sections (17) can be moved by the coordination cables (22). The present invention can access a much larger amount of wind energy, than electricity-generating windmills of the prior art, because the present invention includes the ability to change the shape of each of the partitioned blades (15), so that each blade sub-section (17) of each partitioned blade (15) to intercept and "catch" the maximum amount of wind energy available to that blade subsection (17).

FIG. 3 shows one of the partitioned blades (15) with its blade sub-sections (17) positioned for an optimal "angle of attack" for certain wind conditions. The blade sub-sections (17) have different positions relative to the ribs (18).

The Overall Structure of the First Embodiment

One embodiment of the present invention will be mounted on a pedestal (11). The pedestal is secured on its top with the bearings (81) and on its bottom with the pedestal base (26). This construction also allows the pedestal to be turned to face the wind by the direction control motor (80), which uses the control gear (115) to turn the pedestal.

The pedestal will support a windmill (16), which is part of the present invention. The pedestal (11) will also be supported from below or above by supporting elements which in this case are the support towers (114) and the upper scaffolding (112). Some forms of the upper scaffolding include a metal frame of the type illustrated in the drawings. Some forms of the support towers also include a metal frame of the type shown in the drawings. Any sufficiently strong material will suffice for both the support towers and upper scaffolding. These two components must be designed in such a way that they can provide sufficient structural support for the bearing (81) and the pedestal (11) which is attached to it, for the pedestal to remain upright, and for the pedestal and the components attached to it to be allowed to carry out the functions discussed here in this application.

The windmill (16) of the first embodiment, is not the whole of the first embodiment of the invention. The windmill (16), of the first embodiment includes, but is not necessarily limited to, the pedestal (11), raceway (14), turbine blade area (10), main turbine shaft (53), partitioned blades (15), blade sub-sections (17), ribs (18), blade spars (19) semi-flexible foam (20), flexible epoxy coating (21), coordination cables (22), blade coordination motors (23), a rotating power transfer sleeve (27), a rotor (39), rotating brackets, the lower raceway holding post (44), the upper raceway holding post (45), the raceway support cables (50), the raceway support struts (51), the turbine shaft back end (52), the turbine shaft crown (54), the rotor assembly sleeve (55), the counterweight (57), the blade tips (58), the blade connection cable (59), the turbine shaft front end (61), the intersection node (76), the direction control motor (80), and the blade spar struts (86).

The following components are mounted directly on the pedestal (11), which allows the whole structure of the invention to be made as robust as needed. These components are the main turbine shaft (53), and lower raceway holding post (44) and upper raceway holding post (45). These support the raceway (14). There may also be a support shaft perpendicular to the main turbine shaft (53), where the support shaft supports a set of brackets which support the raceway (14). The lower section of the pedestal (11) from the main turbine shaft (53) down is covered by a rotating power transfer sleeve (27) which is connected to the primary generators (25) through a gear at the rotating power transfer sleeve's bottom. The top of the rotating power transfer sleeve is attached to a 90 degree gear and the other end of the 90 degree gear is attached to the rotor assembly sleeve (55). The rotating power transfer sleeve (27) is connected to the pedestal by bearings. This configuration allows the rotating power transfer sleeve (27) to transmit power from the rotor assembly sleeve to the primary generators (25). The following items can be mounted on the rotor assembly sleeve (55): The blade spars (19), the blade spar support struts (51), the blade coordination motors (23) and the coordination power generators (92). The coordination power generators (92) for the motors connect to a gear which is mounted around the main turbine shaft (53). As the rotor assembly sleeve (55) is turned by the wind, the coordination power generators (92) are turned by the stationary gear on the main turbine shaft (53) generating the power necessary to adjust the shape of the partitioned blades (15) so each blade sub-section (17) has the optimum angle of attack.

The primary generators (25) are at the base of the pedestal (pedestal base) (26). The pedestal base (26) also contains one or more direction control motors (80) that help the windmill (16) to turn so that it can catch the largest amount of wind energy. Essentially, the direction control motors (80) will help the windmill (16) to rotate to face the direction where it can catch the largest amount of wind energy. The invention is designed to ensure that this is possible. The prior art contains several examples of motors that can fulfill the purpose of the direction control motors (80).

At the bottom of the pedestal (11) is a lower bearing (110) that helps the pedestal (11) and windmill (16) to turn if necessary.

The raceway (14) encircles a blade connection cable (59) that connects the blade tips (58) together. The blade connection cable (59) surrounds the blade tips (58) and connects to each of them. This makes the embodiment more robust, and more able to withstand high winds and other pressures.

The windmill (16) will contain the partitioned blades (15), each of which has blade sub-sections (17), and a rotor (39), which includes the partitioned blades (15). The partitioned blades (15) of the rotor (39) of the present invention will be inside a "turbine blade area" (10). The "turbine blade area" (10) is the hollow area in the center of the rotor (39) that contains the partitioned blades (15) as they turn. The raceway (14) encircles the rotor (39) of which the partitioned blades (15) are part. The raceway (14) surrounds, but is not limited to, the turbine blade area (10).

The main turbine shaft (53) supports the rotor assembly sleeve (55), and is connected on both ends to the raceway (14) with cables. A counterweight (57) can be mounted at the end of the main turbine shaft (53) opposite the windward side. The counterweight, if used, should have sufficient weight to counterbalance the force exerted by the components on the windward side. Raceway support struts (51) are mounted from the main turbine shaft (53) to the raceway (14) which is also supported by a rotor assembly sleeve (55) with bearings around the rotating power transfer sleeve (27).

The windmill also contains the main turbine shaft (53), which includes the turbine shaft crown (54), turbine shaft front end (61), and, the turbine shaft back end (52). Coordination cables (22) are also connected to blade coordination motors (23) which are within the turbine shaft back end (52).

The main turbine shaft (53) intersects with the pedestal (11) at the intersection node (76). The part of the main turbine shaft (53) between the intersection node (76) and the turbine shaft crown (54), including the turbine shaft back end (52), is covered by the rotor assembly sleeve (55). This includes the portion of the main turbine shaft (53) that runs through the center of the rotor (39) and the raceway (14). This is also covered by the rotor assembly sleeve (55).

The blade spar struts (86) should extend from a point ¾ of the way up the blade spars to their origin in the turbine shaft front end (61). The blade spar struts (86) should connect to the blade spars at a point ¾ if the distance between the origin of the blade spars on the main turbine shaft (55) and the blade tips (58).

The blade spar struts (86) will also function if they connect to the blade spars at another point. The blade spar struts (86) give additional structural support to the blade spars (19), which helps to keep the partitioned blades (15) intact during high winds. This helps the invention to keep functioning and generating electricity during high winds. The turbine shaft back end (52) and turbine shaft crown (54) are located at the opposite end of the main turbine shaft (53) from the counterweight (57), and the turbine shaft crown (54) is further away from the counterweight (57) than the turbine shaft back end (52). The raceway (14) is between the turbine shaft back end (52) and the counterweight (57). The intersection node (76) is located between the raceway (14) and the counterweight (57). The counterweight (57) helps to keep the main turbine shaft (53), raceway (14) and rotor (39) balanced. This configuration makes the invention more durable, because the structure of the invention receives support from multiple supporting structures. The invention therefore can keep producing power during high winds.

The turbine shaft (53) contains a turbine. Raceway support cables (50) stretch from the turbine shaft crown (54) to the raceway (14). The raceway support struts (51) also stretch from the turbine shaft crown (54) to the raceway (14). Both the raceway support cables (50) and raceway support struts (51) help to provide structural support to the raceway (14), and the partitioned blades (15), making these components more able to stay intact and connected to the rest of the invention during high winds.

The main turbine shaft (53) is held in place by a counterweight (57) which has weight which balances the components on the other side of the main turbine shaft (53) and helps to keep the embodiment level when necessary. The counterweight (57) is between the raceway (14) and the turbine shaft front end (61).

The primary generators (25) are at the pedestal base (26) of the pedestal (11). This means that the partitioned blades (15) and rotor (39) can be supported without the additional weight of the primary generators (25). This is crucial, because the primary generators (25) carry significant weight, and they would detract from the stability of the invention if they were carried at the level of the partitioned blades (15).

The bottom raceway holding post (44) connects with the bottom of the raceway (14) and the top raceway holding post (45) connects with the top of the raceway (14). The rotor assembly sleeve (55) has holes in it, through which pass the coordination cables (22), for the coordination cables (22) to connect directly to the turbine shaft back end (52).

The material for the rotating power transfer sleeve and rotor assembly sleeve (55) may be steel or ceramic or thick aluminum. Other sufficiently strong materials may also suffice.

This embodiment also includes a computer, which controls the direction control motors (80), and which is capable of sensing wind direction, and also capable of receiving input from an anemometer, a device for measuring the speed of wind. An anemometer should be included with the embodiment for maximum effectiveness. Computers which are capable of sensing wind direction, and anemometers, are known in the prior art. Furthermore, this embodiment includes a processor which controls the blade coordination motors (23). This processor will be electronically connected to the computer controlling the direction control motors (80) in a way that allows the computer and the processor to exchange information. The connection may be through exchange of data via wireless internet, or through another method. The prior art contains examples of motors that will serve the role of the blade coordination motors well.

The coordination cables (22) could be made from steel. A 1-inch steel cable is capable of holding 5,000 pounds of weight, and therefore a larger steel cable would be capable of holding more weight.

The Embodiment in Action

The computer gauges the direction of the wind, and constantly uses the direction control motor (80) to adjust the direction that the pedestal (11) is facing. The computer also monitors the output of the anemometer. The computer calculates the angles of attack for each of the blade subsections (17) and waits to be queried by the processor which controls the blade coordination motors (23). The computer also calculates the proper generator loading for the wind speed, which it has sensed, and the computer configures the primary generators (25) to produce electricity optimally at that wind speed. When the antenna connected to the rotor assembly sleeve (55) is straight up, the pedestal (11) will be facing the correct direction for the invention to catch the maximum available amount of wind energy. The processor controlling the blade coordination motors (23) and cylinders will then poll the computer, which transmits to the processor the optimum angle of attack for the individual blade sections (17). The processor will then cause the blade coordination motors (23) and cylinders to adjust the coordination cables (22) until each of the blade sub-sections (17) is at the correct angle for the measured wind speed.

The wind will hit the windward side of the pedestal (11).

When wind blows, the partitioned blades (15) are turned by the wind energy hitting them, and they impart energy to the rotor assembly sleeve (55), making it rotate. The rotor assembly sleeve (55) also surrounds the main turbine shaft (53). The main turbine shaft (53) stretches across the embodiment, and the portion of the main turbine shaft between the pedestal and turbine shaft crown (54) is encased in a rotor assembly sleeve (55). This rotor assembly sleeve (55) mechanically connects to a rotating power transfer sleeve (27) via a 90 degree gear at the intersection node (76). The mechanical energy is passed from the rotor assembly sleeve (55) to the rotating power transfer sleeve (27). The rotating power transfer sleeve (27) stretches up from the pedestal base (26), and so the mechanical energy is transmitted down to the primary generators (25) in the pedestal base (26). The primary generators convert the mechanical energy to electrical energy. There are several materials in the prior art that can be used for the rotor assembly sleeve (55) and rotating power transfer sleeve (27) to ensure that energy is passed from the rotor assembly sleeve (55) to the rotating power transfer sleeve (27), and from the rotating power transfer sleeve (27) to the primary generators (25). The primary generators (25) produce DC electrical power, which will be converted to AC electrical power, in the same manner as a solar power system.

This design allows the blades (15) to be much heavier than the blades in prior art designs, which means that when the blades (15) turn, they generate more electrical energy. Furthermore, a larger number of primary generators (25) can be added to the device, because the primary generators (25) only add additional weight to the pedestal base (26), not the rest of the structure, and the pedestal base (26) is placed on the ground. Therefore, the additional weight of the primary generators (25) does not detract from the stability of the device. The primary generators (25) can also theoretically be placed below ground. This configuration helps the invention to take advantage of the extra wind energy that it collects, and to turn this into electrical energy.

The pedestal (11) and pedestal base (26) are also designed so that the pedestal (11) can be rotated to face the direction of greatest wind. The bearing (81) helps create flexibility at the top of the pedestal (11) which helps the pedestal (11) to turn when necessary. The direction control motor (80) at the pedestal base (26) helps the pedestal (11), and the windmill (J6) to turn to face the direction of greatest wind.

The existence of many cables and wires to support different parts of the invention is necessary and helps to make the invention more durable.

The lower bearing (110) also makes it easier for the windmill (16) to rotate when needed.

From the pedestal (11) protrude the lower raceway holding post (44) and the upper raceway holding post (45). These two posts (44) and (45) connect to the raceway (14). They also help to provide additional stability and strength to the invention. Four lower pedestal support poles (72) are attached to the pedestal (11) at a point above the primary generators (25) to give the pedestal (11) more stability.

A Second Embodiment

A second embodiment includes the components and structure of the first embodiment, arrayed in the same manner as needed for the first embodiment, plus rotating brackets and top support. The rotating brackets are at the top of the pedestal (11) and are connected to the pedestal by the bearing (81). The rotating brackets are divided into tower brackets and straight upper support beams. The top support is a ring which connects to the rotating brackets. The top support can then connect to other structures that provide additional support for the windmill (16) and help it to stay upright.

When the pedestal (11) rotates to accommodate changes in wind direction, the rotating brackets and top support continue to provide support to the pedestal. The bearing (81) connects the rotating brackets and the pedestal (11), and this connection is flexible, and allows the rotating brackets and top support to continue providing support to the pedestal. The rotating brackets, alternatively, can be designed to turn with the pedestal (11), if the connections between the rotating brackets and the top support are made flexible. This can be achieved by having the rotating brackets connect to the top support via the ends of the tower brackets and straight upper support beams fitting into a groove in the inner side of the ring which is the top support. In this way, the rotating brackets can rotate, while the ends of the diagonal upper support beams and straight upper support beams move through the groove in the top support and continue to be supported by the top support.

The division of the rotating brackets into tower brackets and straight upper support beams which placed in the configuration shown by the drawings is designed to make it easier for the pedestal (11) to rotate while continuing to be supported by the rotating brackets.

This embodiment also includes two or more external support arrays that are connected to the top support. The external support arrays each contain a stilt which extends downward from the top support and terminates at the buttress knob. A pillar extends downward from the buttress knob through the cornerstone knob and to the ground. Footings extend from the cornerstone knob to the ground. The footings and pillar support the cornerstone knob and buttress knob, which in turn support the stilt that provides additional strength to the top support. This design provides the invention with a further increase in stability and strength, because the top support and rotating brackets help to support the windmill (16) from above, meaning that the invention can be placed in more locations, and also making the windmill (16) more able to turn in response to changes in wind direction. Furthermore, this design makes the invention more able to stay intact and functioning during high winds.

A Third Embodiment

A third embodiment includes the components and structure of the first embodiment, and also includes a shroud (67). The shroud is hollow and allows wind to blow through it, to blow through the raceway (14) and the blades (15), and to blow out the other end. One version of the shroud extends from the raceway to the ground at a 45 degree angle in both directions, and also extends upward from the raceway at a 45 degree angle in both directions. The shroud does not touch the ground, but terminates before it reaches the ground. Shroud unfurling struts (68) which extend from the turbine shaft crown (54) and the turbine shaft front end (61) along the edge of the shroud (67) will keep the shroud (67) deployed and will ensure that the shroud extends both upwards and downwards at a 45 degree angle relative to the raceway, or if the shroud is configured in another manner. The shroud covers the raceway (14) and touches the outer edge of the raceway (14). Much of the wind going through the shroud (67) will be forced to go through the raceway (14), increasing its velocity.

The purpose of the shroud (67) is to funnel wind through the raceway (14). This increases the velocity of the wind and increases the energy of the wind moving through the raceway (14) through an effect similar to the Venturi effect. Therefore, the energy of the wind hitting the partitioned blades (15) will be greater, and they will transfer more energy to the turbine shaft (53).

The shroud can be made of any of several sturdy types of cloth, which are presently on the market. The shroud can also be made of other lightweight materials. Furthermore, the shroud can be made of a ceramic material sprayed onto a cloth. Such compositions are already on the market.

Much of the air will pass through the raceway (14) but some of the air will be forced around the shroud. The shroud's (67) size and shape will determine the force it takes to force the air around the shroud (67). This force will determine the pressure in front of the blade cylinder. As the air passes around the back of the shroud (67) the air stream will be bent into the center of the shroud much like the air is bent over the back of a wing, causing a low pressure on the backside of the blades. This differential pressure is similar to the Venturi effect. The speed of the wind through the blades will be dependent on the size and shape of the shroud (67). If the shroud is large enough, and has an optimal shape, it could double the wind speed through the rotor (39), which would mean four times as much wind energy would hit the partitioned blades (15), which would be an incredible improvement over windmills of the present design.

The wind through the raceway (14) causes the partitioned blades (15), and therefore the entire rotor (39) to rotate. The blades in a sixty mph wind will have to withstand wind speeds of over 130 mph through the raceway. In order to be stable at that speed the blade spar struts (86) will keep the blades ridged in the windward direction and the cable connecting the blade spars (19) through the raceway (14) will keep the blade spars (19) ridged in the back and forth direction. The blade sub-sections (17) will individually be kept ridged by the coordination cables (22). All of these support structures will have to be made robust enough to support winds of the aforementioned velocities. When the winds reach a speed where the primary generators (25) reach their maximum output, the angle of attack of the partitioned blades (15) will be scaled back, so there will be no increase in the pressure on the partitioned blades (15). The mechanical rotation energy of the rotor assembly sleeve (55) will be transmitted through the 90 degree gear to the rotating power transfer sleeve (27) which turns the primary generators (25).

A Fourth Embodiment

A fourth embodiment includes the components and structure of the third embodiment, and also includes a connection between the primary generators (25) and a pump. The primary generators (25) provide electrical power to the pump which pumps water into a reservoir. When the amount of electrical power generated by the invention falls below a certain level, water is allowed to flow out of the reservoir. A small hydroelectric device is powered by the flowing water and produces electricity. This helps to ameliorate the effects on the power grid of inconsistency in the amount of electrical power produced by the invention. The embodiment can potentially "store" excess electrical energy, which it produces, by powering the pump which pumps water into the reservoir, where the water produces electricity when the water is allowed to flow out of the reservoir. In this was, as much as 50% of the excess electrical energy produced by the embodiment can be stored and used later. In theory, a large number of electricity-generating machines of the type described here could be connected to the same pump, which would be connected to the same reservoir, which in turn would be connected to the same hydroelectric device.

Positive displacement pumps can be used in this embodiment of the invention. They are designed to pump fluid under high pressure with extremely high efficiency, over 95%. The positive displacement pump can be converted to a generator when there is no wind. A positive displacement generator can be used to convert high pressure from the reservoir to mechanical power, to run an electric generator. Both the positive displacement pump and positive displacement generator can have an efficiency of over 95%, so the net loss of power related to this storage system should be low. The major problem with this system is finding two reservoirs of sufficient size, close enough together, and with a difference of at least 2000 ft. in elevation between them. This would be required to store power, using this embodiment of the invention, in an optimal manner, though this embodiment of the invention could also be used to store power if the difference in elevation between two reservoirs is less than 2000 ft.

A Fifth Embodiment

In a fifth embodiment, the shroud has the shape of a nozzle (nozzle-shaped shroud) (100), which further helps to funnel the wind energy through the raceway (14), and increases the velocity of the wind passing through the raceway (14) even more than the shroud in the fourth embodiment does. This nozzle-shaped shroud (100) provides superior performance over the shape of the shroud (67) described in the fourth embodiment, because the nozzle-shaped shroud (100) increases the velocity of the wind passing through the raceway (14) more than the shape of the shroud described in the fourth embodiment does. The nozzle-shaped shroud struts (105) in this case are struts that are designed to help the nozzle-shaped shroud (100) keep the nozzle shape.

A Sixth Embodiment

In a sixth embodiment, a rigid nozzle (85) is substituted for the shroud (67) described in the fifth embodiment. The rigid nozzle (85) should be made of lightweight material such as aluminum, or a ceramic substance sprayed onto the cloth, and the rigid nozzle (85) should be thin, to minimize its weight.

A Seventh Embodiment

The seventh embodiment adds together the components and structure of the first embodiment with the additional components and structure discussed with relation to the second, fourth, and fifth embodiments. Each of these components is performing the same tasks, in the same manner, that it is described as performing above, with relation to the embodiment that is first described as comprising that component. Because the seventh embodiment includes the components related to several different embodiments, it involves the components of all of those embodiments, and therefore can generate electrical power from wind, but also includes the shroud (67) discussed with relation to the fifth embodiment, and uses connections to a reservoir and a pump to store electricity, like the fourth embodiment. Furthermore, the seventh embodiment includes external support arrays of the type discussed with relation to the second embodiment. Thus, the seventh embodiment involves, but is not necessarily limited to, the following components: (10) Turbine blade area. (11) Pedestal. (14) Raceway. (15) Partitioned blade. (16) Windmill. (17) Blade sub-section. (18) Rib. (19) Blade spar. (20) Semi-flexible foam. (21) Flexible epoxy coating. (22) Coordination cables. (23) Blade coordination motors. (25) Primary generator. (26) Pedestal base. (27) Rotating power transfer sleeve. (39) Rotor. Rotating brackets. Tower brackets. Top support. (44) Lower raceway holding post. (45) Upper raceway holding post. (50) Raceway support cables. (51) Raceway support strut. (52) Turbine shaft back end. (53) Main turbine shaft. (54) Turbine shaft crown. (55) Rotor assembly sleeve. (57) Counterweight. (58) Blade tips. (59) Blade connection cable. (61) Turbine shaft front end. (68) Shroud unfurling strut. Pump. Reservoir. Hydroelectric device. (72) Lower pedestal support pole. (76) Intersection node. (80) Direction control motor. (81) Bearing. (86) Blade spar struts. Buttress knob. Footing.

An Eighth Embodiment

In the eighth embodiment, the bearing (81) is, in turn, supported by the upper scaffolding (112), which connects to the support towers (114), which extend to the ground. The support towers (114) support the upper scaffolding (112), which in turn helps to support the pedestal (11) from above. This creates a box like framework including the support towers (114) and upper scaffolding (112) which creates a non moving boxlike support framework for the moving components of the system. This eighth embodiment also involves all the components of the first embodiment, and also involves the nozzle-shaped shroud discussed with reference to the fifth embodiment, and involves the connection between the primary generators (25) and a pump discussed with reference to the fourth embodiment.

The eighth embodiment is the preferred embodiment, because it will likely produce the most electrical energy, will store that energy, and will involve the largest amount of structural support to the windmill.

It is also possible to combine the components and structure discussed with relation to the first, second, third, and fifth embodiments, or alternatively the components and structure discussed with relation to the first, second, and fourth embodiments, or the components and structure discussed with relation to the first, second, and fourth embodiments, or alternatively the components and structure discussed with relation to the first, second, and sixth embodiments. Other combinations may also be possible. The components and structure discussed with reference to the eighth embodiment may also be combined with the first, third, fourth, fifth, sixth, or seventh embodiment.

Other Characteristics of the Invention

It is estimated that the total height of the pedestal (11) should be around 280 feet, to maximize this invention's superiority, in ability to generate electrical energy, over electricity-generating windmills of the prior art. The invention will remain structurally sound at that height. The size of the partitioned blades (15) will also be maximized, which should maximize the total amount of electrical energy generated by the invention. However, larger or smaller variations are possible, and should also provide substantial benefits in the amount of electricity generated in comparison to equally tall electricity-generating windmills of the prior art. For example, a variation of the invention with a 30-foot pedestal should produce much more electrical energy than a 30-foot-tall electricity-generating windmill of the prior art.

The diameter of the shroud (67) at its edges could be as much as two times the diameter of the raceway (14). The whole blade assembly could be as much as 150 meters above the ground, depending on where the maximum wind velocity in the area is located. If the device is located on a hill or rise, the maximum wind velocity would probably be near the ground. The length of the partitioned blades (15) could be as long as one hundred and seventy feet each.

Embodiments which utilize a shroud, nozzle-shaped shroud, or rigid shroud may include a hole for the pedestal to pass through. It should be understood that this hole should be as small as possible, so as not to allow much wind to escape through the hole. The only thing passing through the hole should be the pedestal, if possible.

This invention would generate DC electricity, which would be converted to "60 hz" AC electricity. This would enable the invention to generate power at low wind speeds, without the need for the blades to turn at a specific speed in order to directly generate "60 hz" AC electricity, sometimes known as "60" AC electricity. The invention does not need to run the blades at "60 cycle sync speed", which has the advantage of allowing the blades to run at variable speeds. This will maximize power out over a large range of wind speeds. This design will also produce power at slow wind speeds, in the 4 or 5 miles per hour range. The blade tips may move at speeds higher than 400 miles per hour, when the device operates at higher wind speeds.

The design of the present invention, with a large number of cables supporting each of the rotors (39), also means that the invention can have more rotors (39) than previous windmills which generate electricity. This is because the cables allow more rotors (39) to be supported by the invention.

Another advantage of the present invention is that each windmill can support at least 4 blades per rotor, and that these blades each have a much greater area than the blades of electricity-generating windmills of the conventional design. While the blades of the conventional rotors (3) of a windmill of the prior art might cover 9 degrees, the four larger blades (15) of the rotors (39) of the windmills of the present invention can embrace at least 120 degrees, and therefore be able to capture more wind energy. In combination, the features discussed above mean that the windmill of the present invention can capture much more of the wind energy flowing through a given area than conventional windmills can.

A machine built in the form of the eighth embodiment of the present invention can produce between ten and twenty times as much electricity, from the same amount of wind energy, as a conventional windmill.

The fact that the turbine of the present invention is supported from above makes this invention easy for the support cables to support other components of the invention and move, and also easier for the windmill (16) to move to catch the wind. Wind machines of the present invention can be deployed side to side, and in multiple numbers and utilize same support structures, including hanging frame ends.

The proposed system is also much more simple to install than previous inventions in this field. Previous windmills which generate electricity have generally required complicated, expensive, installation.

Because the instant invention can generate electrical power from wind, at a much greater range of wind speeds than electricity-generating windmills of the prior art, the machine of the present invention can also be installed in a much greater range of locations than windmills of the prior art. Most of the components of the invention can be composed of aluminum or stainless steel, or lightweight metallic alloys. The functions of the turbine, primary generators, blade coordination motors, rotor assembly sleeve, rotating power transfer sleeve, pump, bearing, and hydroelectric device, and reservoir, can be fulfilled by examples of these components which are presently available on the market and known in the art.

It is important to note that the weight of the different components of the invention must be balanced properly, in order to make sure that the different components of the invention receive appropriate amounts of structural support and are counterbalanced properly as contemplated by the invention. There are several computer programs presently on the market that can calculate the amount of force exerted by the weight of the different components of the invention, and whether or not the different components of the invention are counterbalanced as intended.

Many of the components of the invention, such as the blade spar struts, coordination cables, and the raceway support cables (50) are long and thin because they need to be thin. Otherwise, they would block the wind energy passing through the invention. It is also important that the components of the external support arrays, the turbine shaft, and the lower pedestal support poles should also be as lightweight as possible, and should be thin if possible, because this helps to reduce the weight of the invention.

Computers which presently exist can be used to monitor conditions and control the direction control motor (80) so that it turns the windmill (16) in the direction where the windmill (16) will capture the maximum available amount of wind energy. Computers which presently exist can also be used to monitor conditions and control the blade coordination motors (23) so that they move the coordination cables (22), to move the blade sub-sections (17) into a position where the blade sub-sections (I 7) capture the largest possible amount of wind energy. The invention could theoretically function if sufficient reinforcement is given from above to the top support. This would obviate the need for the external support arrays in certain embodiments of the invention.

One of the reasons that this device is unique is that much of the weight of the device is focused towards the base of the device, with thrust bearing towards the base of the device. This differs from windmills of the prior art, where much of the weight is focused on the conventional center.

The invention is explicitly not limited to the components and configurations described herein, but also includes their structural and functional equivalents, as long as those are within the spirit of the invention.

DETAILED DESCRIPTION OF THE DRAWINGS

Figure 1:
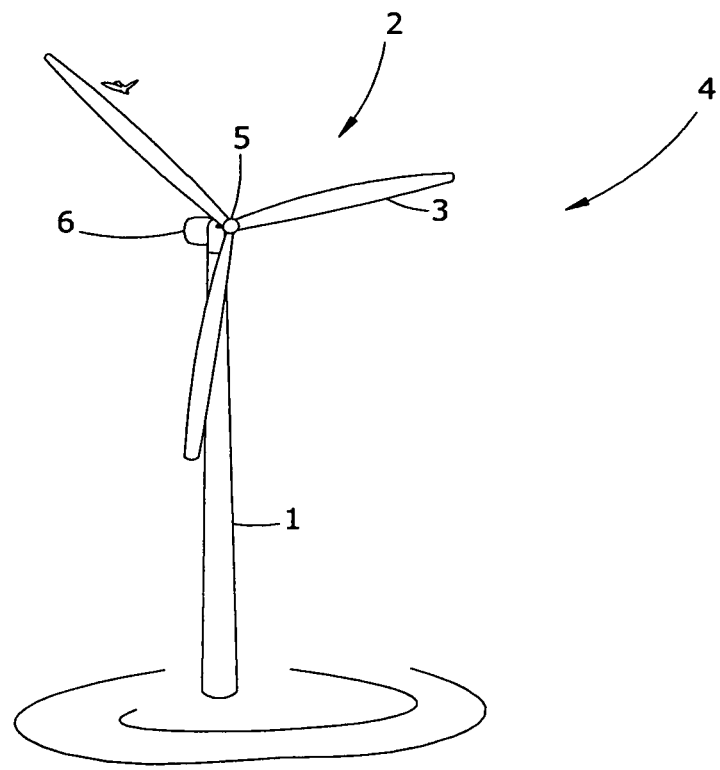
FIG. 1 illustrates a standard electricity-generating windmill of the prior art.

FIG. 1 illustrates a standard electricity-generating windmill of the prior art, or conventional windmill (4). The conventional pole (1) supports each of the conventional blades (2) of the conventional rotor (3). The blades rotate in the direction of the arrow, and drive a conventional generator (6), which generates electrical power. A bird is about to hit one of the conventional blades (2). The fact that the conventional generator (6) is mounted on the conventional pole (1) next to the conventional center (5) means that the size of the conventional generator (6) must be limited, or it will make the conventional pole (1) unstable.

Figure 2:
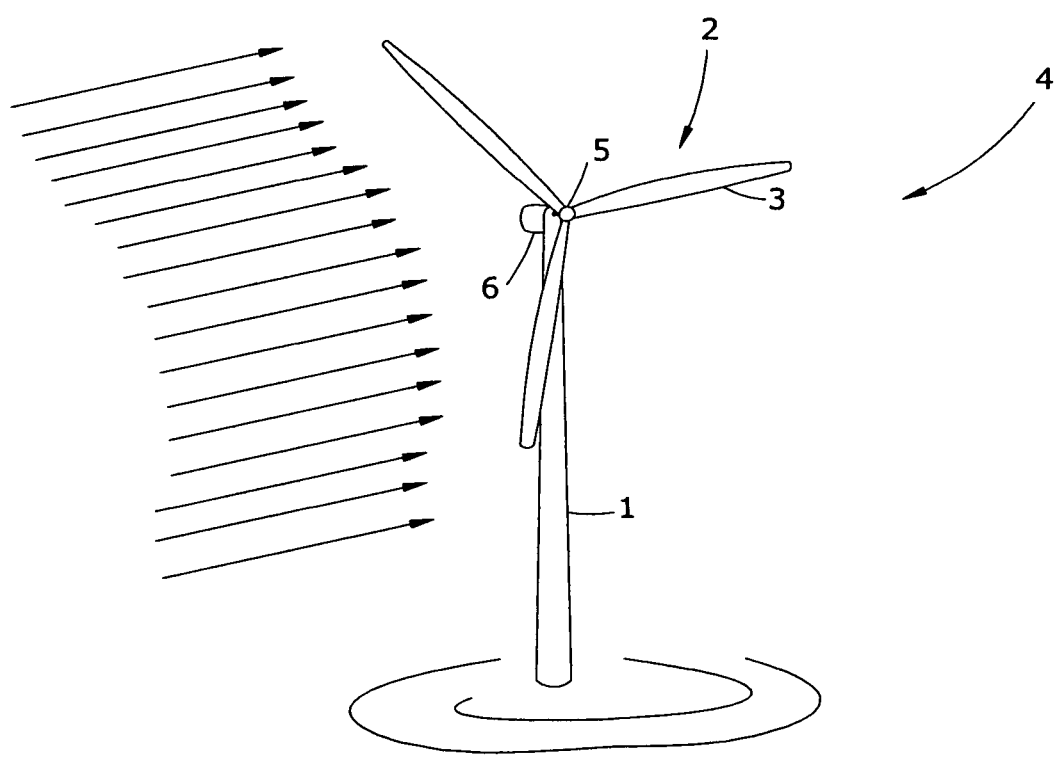
FIG. 2 illustrates a standard electricity-generating windmill of the prior art with the wind blowing parallel to the blades.

FIG. 2 shows an electricity-generating windmill of the prior art, or conventional windmill (4). The wind is blowing parallel to the blades (2), and therefore not much wind energy is hitting the blades (2).

Figure 3:
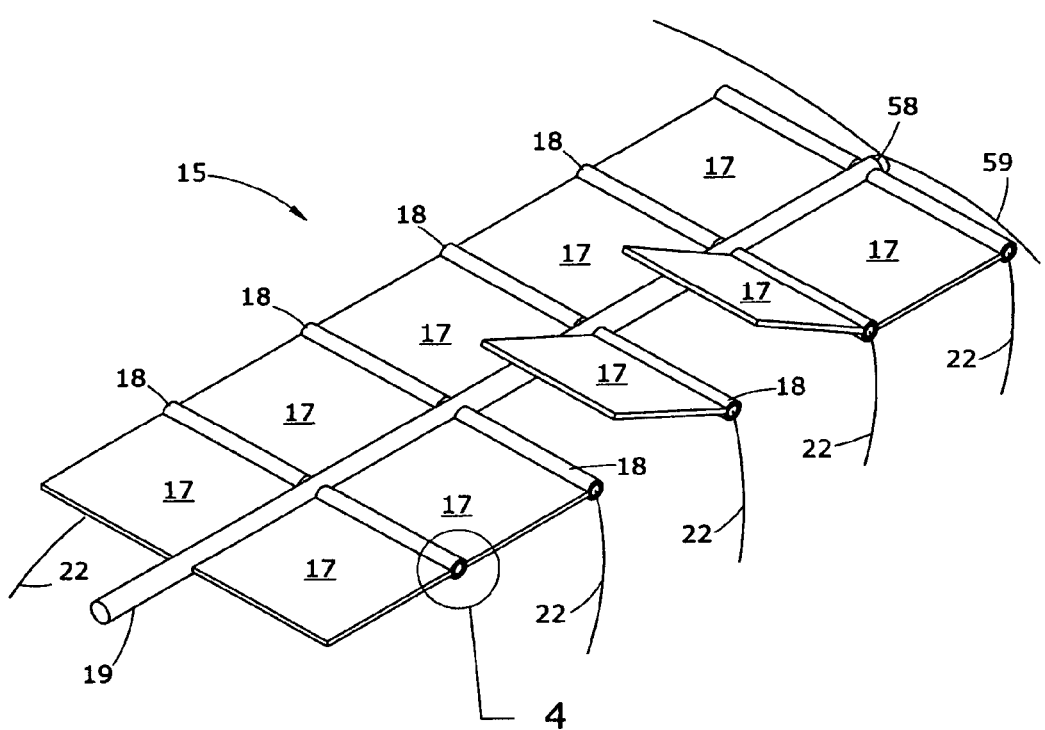
FIG. 3 is a "close-up" picture of one of the partitioned blades (15).

FIG. 3 is a "close-up" picture of one of the partitioned blades (15). The blade spar (19) can be seen running through the center of the partitioned blade (15), and the ribs (18) can be seen emanating outwards from the blade spar (19). The blade sub-sections (17) can also be seen, and each of them is connected to one of the ribs (18). The blade sub-sections (17) on the right side of the blade spar (19) are each positioned for a different angle of attack, and those on the left side of the blade spar (19) are each positioned for the same angle of attack. This illustrates how the angle of attach can be changed for each of the blade sub-sections (17). The coordination cables (23) can be seen connected to the ribs (18). The blade tip (58) can be seen at the end of the blade, and part of the blade connection cable (59) can also be seen connected to the blade tip (58).

Figure 4:
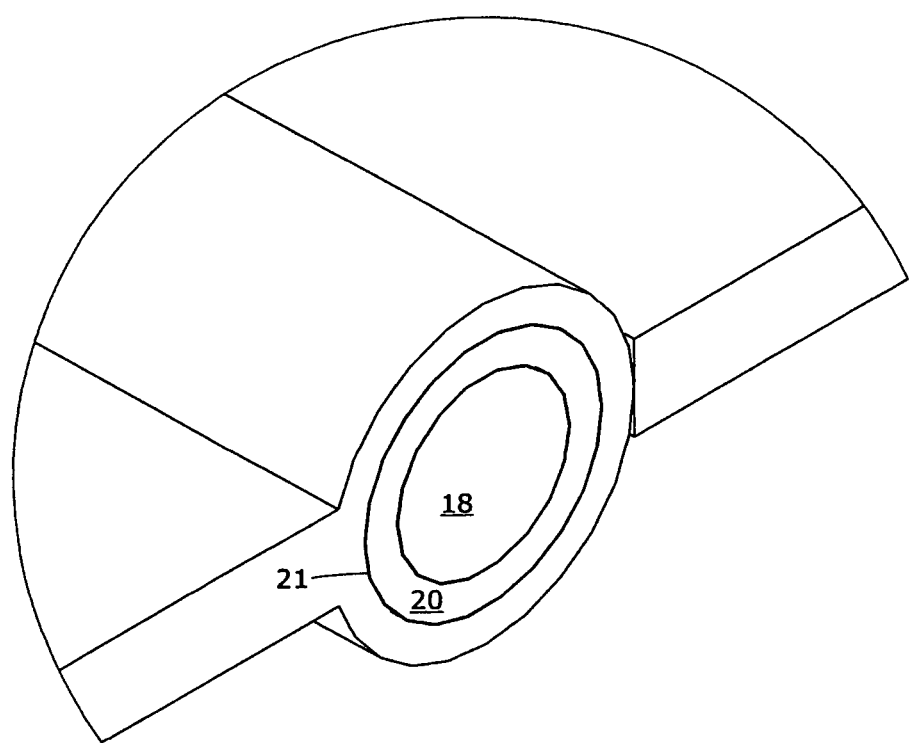
FIG. 4 shows a close-up view of one of the ribs (18).

FIG. 4 shows a close-up view of one of the ribs (18). Around the rib are semi-flexible foam (20) surrounded by a flexible epoxy coating (21). This configuration allows the rib (18) to change the direction that the blade sub-section (15) attached to this particular rib (18) faces. The semi-flexible foam (20) and flexible epoxy coating (21) make it easier to move the blades sub-section (15) when necessary.

Figure 5:
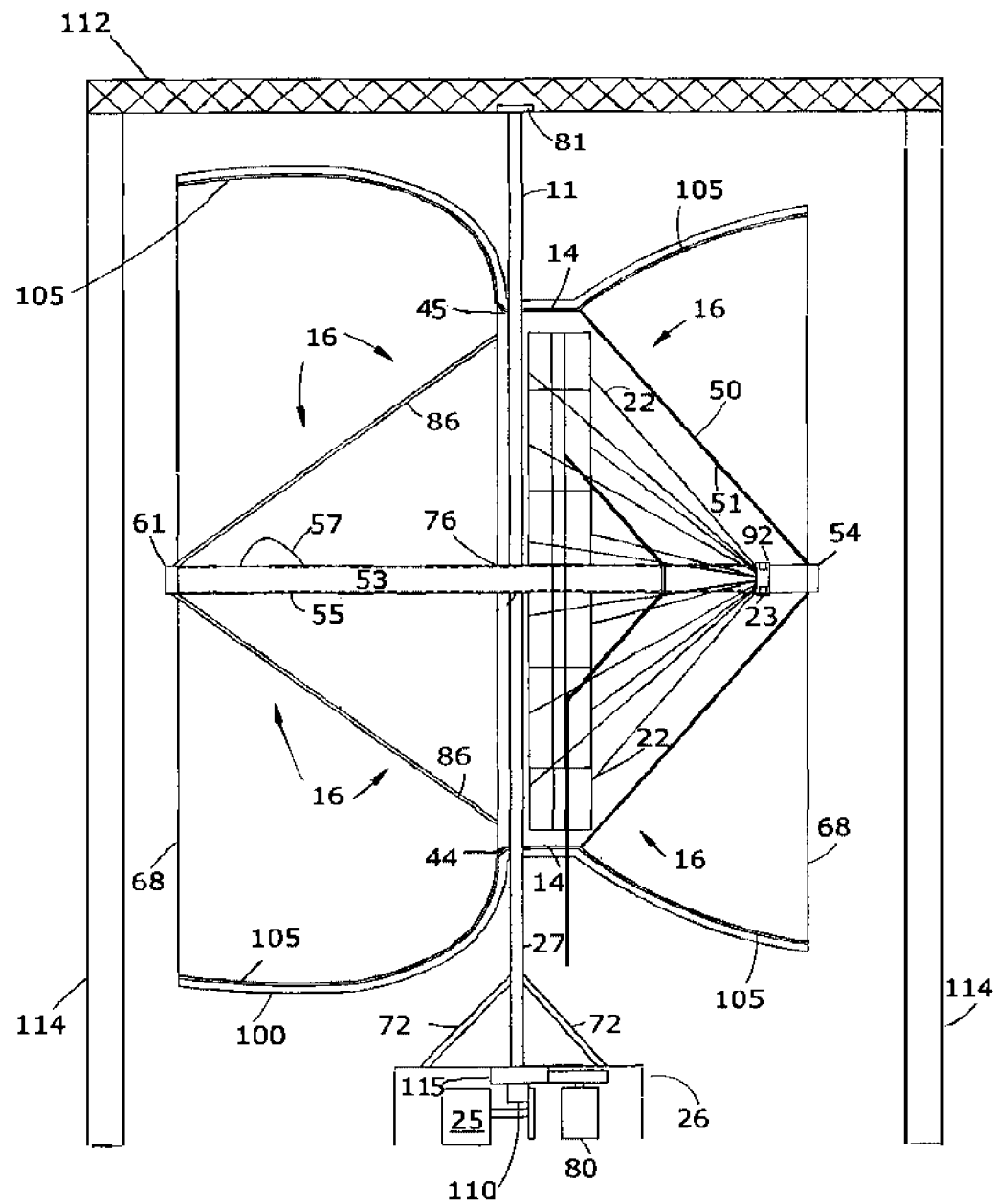
FIG. 5 shows a "cut-away" illustration of the fifth embodiment of the device.

FIG. 5 shows a "cut-away" illustration of the fifth embodiment of the device. Here, the device is partially supported by two support towers (114) that support the upper scaffolding (112). The upper scaffolding (112) is lighter than a solid piece would be, so that more weight can be distributed to the pedestal (11) and associated components. The bearing (81) connects the upper scaffolding (112) and the pedestal (11) either directly or indirectly. The nozzle-shaped shroud struts (105) keep the nozzle-shaped shroud (100) in the correct shape, so that wind can flow through it and turn the turbine inside the turbine shaft. Shroud unfurling struts extend from the turbine shaft front end (61) to the front edges of the shroud, and from the turbine shaft back crown (54) to the back edges of the shroud.

Lower pedestal support poles (72) are near the pedestal base, and help to support the pedestal and make sure it stays upright. The pedestal projects upwards from the pedestal base (26). In this version of the invention, the direction control motor (80) is connected to the lower bearing and the pedestal, and helps to turn the pedestal when needed. A generator (25) is also shown. The generator and direction control motor do not have to be inside the pedestal base, but are inside it in this particular version of the embodiment.

Various components of the windmill (16) can be seen. The raceway (14) is in the center of the windmill (16), and the nozzle shaped shroud struts (105) and nozzle-shaped shroud (100) project out from the raceway (14). Nozzle-shaped shroud struts also project from the turbine shaft front end (61) to the front ends of the shroud and from the turbine shaft crown (54) to the back ends of the shroud. Blade spar struts (86) project from the turbine shaft front end (61) to the raceway (14). On the other side of the windmill, raceway support cables (50) and rigid raceway support struts (51) stretch from the turbine shaft crown (54) to the raceway (14). The blade spar struts (86), raceway support cables (50) and rigid raceway support struts (51) all provide structural support to the raceway.

The blade coordination motors (23) are inside the turbine shaft back end. They control the coordination cables (22), which move the blade sub-sections of the partitioned blades, as can be seen.

The turbine shaft (53) is surrounded by the rotor assembly sleeve (55). The turbine shaft sleeve and turbine shaft intersect with the pedestal (11) at the intersection node (76). The rotor assembly sleeve connects with the rotating power transfer sleeve (27) via a 90-degree gear at or near the intersection node. The 90-degree gear is not shown. The rotating power transfer sleeve proceeds down the part of the pedestal below the intersection node and transfers power to the generators.

Figure 6:
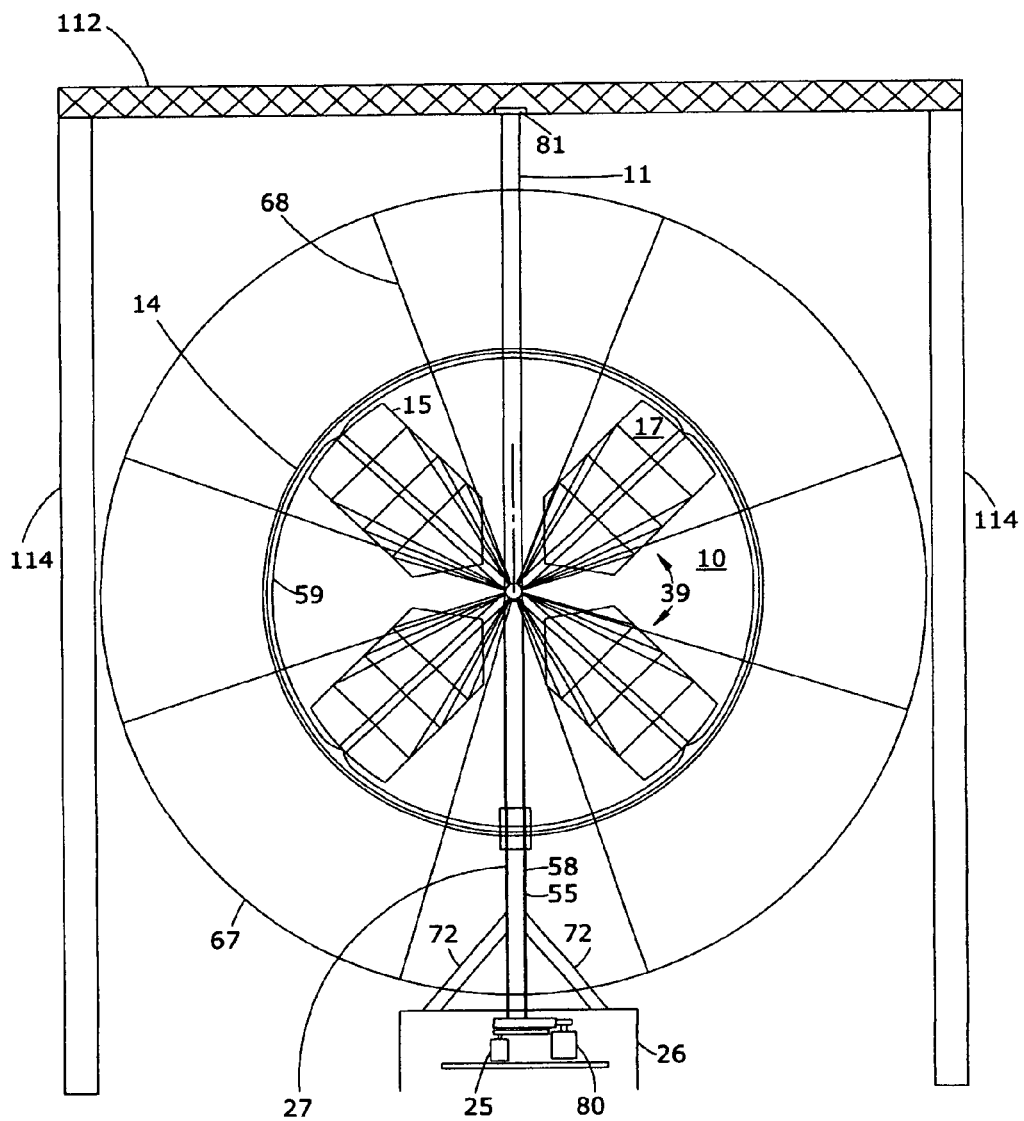
FIG. 6 shows a version of the third embodiment of the invention from the back.

FIG. 6 shows a version of the third embodiment of the invention from the back. Two of the support towers (114) can be seen holding up the upper scaffolding (112). The upper bearing (81) is also visible, holding up the pedestal (11). The shroud (67) is seen coming out from the raceway, and the shroud unfurling struts (68) keep the shroud unfurled so that the velocity of wind passing through it will be increased. The shroud's edges project upwards and downwards from the raceway (14) with a 45 degree angle, but this may not be discernible from the drawing.

The rotor (39) comprising all the partitioned blades (15) is visible. The area where the rotor (39) turns is the turbine blade area (10). One of the partitioned blades (15) is designated and one of the blade sub sections (17) is visible. The blade connection cable (59) can be seen surrounding and connecting the partitioned blades (15).

The rotating power transfer sleeve (27) can be seen projecting down towards the pedestal base. Lower pedestal support poles (72) are near the pedestal base, and help to support the pedestal and make sure it stays upright. The pedestal projects upwards from the pedestal base (26). In this version of the invention, the direction control motor (80) is connected to the lower bearing and the pedestal, and helps to turn the pedestal when needed. A generator (25) is also shown. The generator and direction control motor do not have to be inside the pedestal base, but are inside it in this particular version of the invention.

Figure 7:
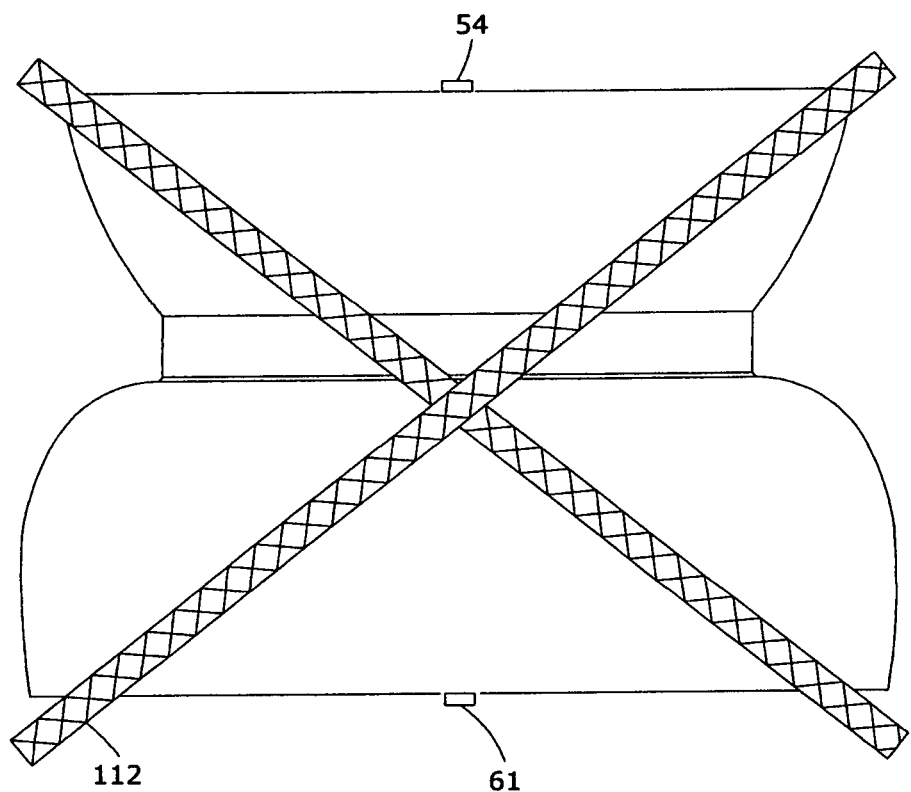
FIG. 7 shows the fifth embodiment of the invention from the top.
Figure 8:
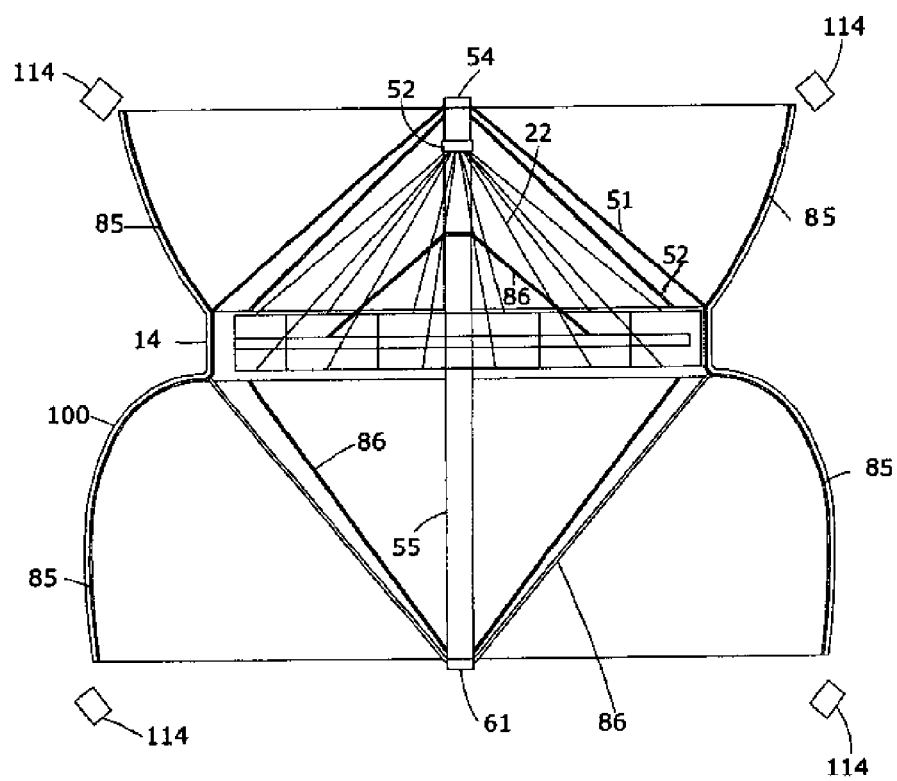
FIG. 8 is a "cut-away" view of the fifth embodiment of the invention from the top.

FIG. 7 shows the fifth embodiment of the invention from the top. The nozzle-shaped shroud (100) can be seen, and the upper scaffolding (112) is visible above it. The support towers are directly below the ends of the upper scaffolding and therefore not visible in this drawing. The turbine shaft front end (61) and turbine shaft crown (54) are both visible, but most of the other components of the invention are hidden by the nozzle-shaped shroud (100). FIG. 8 is a "cut-away" view of the fifth embodiment of the invention from the top. The nozzle-shaped shroud (100) can be seen, and the nozzle-shaped shroud struts (105) can also be seen keeping the shroud in its correct position. They project out of the raceway (14). The support towers (114) and their location can be seen. The upper scaffolding is not shown in this drawing. The turbine shaft is shown, beginning with the turbine shaft front end (61). Blade spar struts (86) project out of the turbine shaft front end (61) and each reach a point on one of the blade spars (19) between the turbine shaft and the turbine shaft tip (58).

The coordination cables (22) can be seen projecting out of the turbine shaft front end (52) and reaching the ribs (18) of each of the blades.

Figure 9:
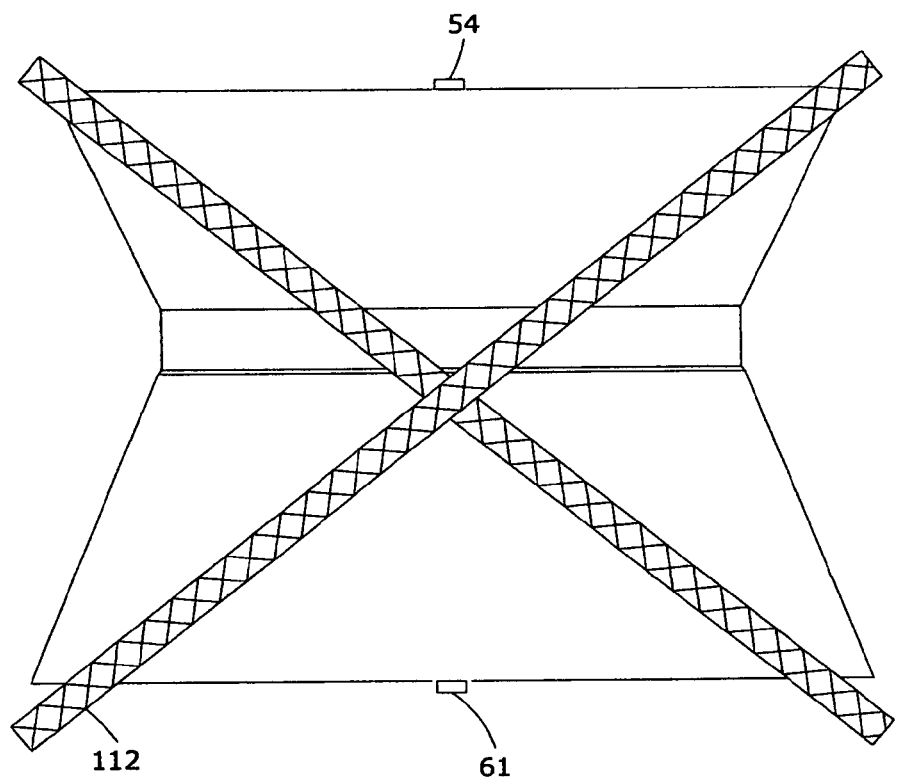
FIG. 9 shows the third embodiment of the invention from above.

FIG. 9 shows the third embodiment of the invention from above. The shroud (67) is in an hourglass shape, and its edges projects both upwards and downwards with a 45 degree angle from the raceway (1'4). This helps to direct wind through the invention, and to increase the velocity of this wind. The upper scaffolding (112) is visible above the shroud. The support towers are directly below the ends of the upper scaffolding and therefore not visible in this drawing. The shroud (67) covers most of the components of the invention, but the turbine shaft front end (61) and turbine shaft crown (54) can be seen.

The invention claimed is:

1. A machine for generating electricity comprising the following components:
   a pedestal (11); a pedestal base (26);
   one or more primary generators (25) located in or below said pedestal base (26); said primary generators (25) being capable of generating electricity;
   a windmill (16);
   one or more upper bearings (81);
   said windmill (16) comprising said pedestal (11); and also comprising a main turbine shaft (53); said main turbine shaft further comprising a turbine shaft back end (52); and a turbine shaft crown (54); and a turbine shaft front end (61);
   an intersection node (76) where said pedestal (11) intersects with said main turbine shaft (53);
   and said windmill (16) also further comprising a rotor assembly sleeve (55) that surrounds a portion of said main turbine shaft (53) between said turbine shaft crown (54) and said intersection node (76); where
   said rotor assembly sleeve (55) is capable of receiving and transmitting mechanical energy transmitted to said rotor assembly sleeve (55) by the rotation of partitioned blades (15);
   and a rotating power transfer sleeve (27) which surrounds a portion of said pedestal (11) between said pedestal base (26) and said intersection node (76); where said rotating power transfer sleeve (27) is connected to said rotor assembly sleeve (55) and is capable of receiving and transmitting mechanical energy transmitted to said rotating power transfer sleeve (27) by said rotor assembly sleeve (55);
   said windmill further comprising a raceway (14);
   where said raceway (14) is a ring with a large hollow space in its center, where said large hollow space is the turbine blade area (10); and is open all the way through the raceway (14);
   said windmill (16) further comprising a rotor (39); said rotor (39) further comprising said partitioned blades (15);
   each said partitioned blade (15) further comprising a blade spar (19) that extends from said turbine shaft (53) through a length of said partitioned blade (15) to a blade tip (58) of said partitioned blade;
   said windmill (16) further comprising a blade connection cable (59) that surrounds said blade tips (58) and connects to all of said blade tips (58) in the rotor (39);
   said windmill (16) further comprising blade spar struts (86) that begin at said turbine shaft front tip (61) and extend to points on each blade spar that are between the turbine shaft (53) and the blade tip (58) which is connected to that blade spar (19);
   where said blade spar struts (86) provide structural support to said blade spars (19);
   where, in response to wind hitting said partitioned blades (15), said partitioned blades (15) turn, thus imparting mechanical energy to said partitioned blades (15), which then transmits said mechanical energy to said rotor assembly sleeve (55) and said main turbine shaft (53), so that said mechanical energy is transmitted to said rotating power transfer sleeve (27); which in turn transfers said mechanical energy to said primary generators (25), which generate electricity.

2. The machine of claim 1 further comprising a counterweight (57) attached to said main turbine shaft (53) at a point between said intersection node (76) and said turbine shaft front end (61);
   said counterweight (57) helping to correct any imbalance between a weight of the components of the invention on one side of the intersection node (76) and a weight of the components of the invention on another side of the intersection node (76).

3. The machine of claim 1 further comprising
   one or more lower pedestal support poles (72) that rest on the ground and provide structural support to said pedestal (11).

4. The machine of claim 1, further comprising
   that the machine is placed inside a gap within another structure, where wind can directly hit the partitioned blades (15) of the machine;

one or more direction control motors (80) located in or below said pedestal base (26).

5. The machine of claim 1, further comprising
a direction control motor (80) located in or below said pedestal base (26);
a lower bearing (110) located in or below said pedestal base (26); said upper bearing (81) being on top of said pedestal (11) and permitting said pedestal (11) to rotate; and,
said machine for generating electricity also comprising that said direction control motor (80) can cause said pedestal (11) to rotate, thus causing said windmill (16) to also rotate with said pedestal as its axis of rotation; said rotation being facilitated by said lower bearing (110) directly below said pedestal (11) and said upper bearing (81) directly above said pedestal (11); said rotation changing the direction in which said partitioned blades (15) face, thus allowing said partitioned blades to intercept the largest amount of wind energy that is available.

6. The machine of claim 5, further comprising that the primary generators (25) are controlled by a computer that is capable of at least one of the following;
  a) calculating the optimal orientation for the partitioned blades (15) to face so that they capture the maximum possible amount of wind energy;
  b) controlling the direction control motor (80) so that it turns the pedestal (11) to position the raceway (14) and partitioned blades (15) to capture the maximum possible amount of wind energy;
  (c) managing primary generator torque and speed;
  (d) controlling each primary generator and managing generator back torque;
  (e) converting variable frequency power provided by the primary generators to 60 Hz AC electricity synchronized to grid power from an electrical power grid;
  (f) controlling reactive power measured by the primary generators;
  (g) controlling an output from each primary generator;
  (h) controlling the output of all primary generators together;
  (i) sensing wind direction when connected to an anemometer, and using information about the wind direction to calculate the optimal "angle of attack" for each of blade sub-sections (17) of each of the partitioned blades (15).

7. The machine of claim 1, further comprising;
a hollow shroud (67) surrounding space immediately before and behind the raceway (14) shaped approximately like an hourglass, which has holes for the pedestal (11) to pass through, and which has an opening to the front of the raceway (14), and an opening to the back of the raceway (14), allowing wind to pass through both openings; and which is centered on, and connected to, said raceway (14);
  where the lower surface of said shroud (67) extends from the raceway to the ground at a 45 degree angle, both to the back of the raceway and to the front of the raceway, but said shroud (67) terminates before it reaches the ground; and the upper surface of said shroud (67) also extends upward from the raceway; both to the back of the raceway and to the front of the raceway at a 45 degree angle, so that both the opening in the shroud (67) to the back of the raceway (14) and the opening in the shroud (67) to the front of the raceway (14) are wider than the raceway (14); and said machine also comprises shroud unfurling struts (68) which extend from the raceway (14) away from, and to the back of the raceway (14) at approximately a 45 degree angle downwards, throughout the length of the shroud; and, in addition, said shroud unfurling struts (68) that extend at a 45 degree angle upwards, and also away from, and to the front of the raceway (14) throughout the length of the shroud;
  and said shroud unfurling struts (68) also extend from the raceway (14) at approximately a 45 degree angle downwards and to the front of, the raceway (14) and, in addition, said shroud unfurling struts (68) also extend from the raceway (14) at a 45 degree angle upwards, and to the front of, the raceway (14), and said shroud unfurling struts (68) help to keep the shroud (67) deployed in a configuration where the shroud extends outwards to the back of the raceway (14), with its upper surface inclined up at a 45 degree angle, and its lower surface inclined down at a 45 degree angle, and where said shroud also extends outwards to the front of the raceway (14) with its upper surface inclined up at a 45 degree angle and its lower edge inclined down at a 45 degree angle.

8. The machine of claim 1, further comprising:
a lightweight rigid nozzle (85) that extends outwards from the raceway (14) and has a hole for the pedestal (11) to pass through;
where said rigid nozzle (85) has an opening to the front of the raceway (14), and an opening to the back of the raceway (14), allowing wind to pass through both openings;
and where said rigid nozzle (85) expands its diameter as it extends out to the back of the raceway (14); and out to the front of the raceway (14) so that said rigid nozzle (85) appears to have the shape of a nozzle, when the rigid nozzle (85), raceway (14) and windmill (16) are viewed from the left or the right, and said rigid nozzle (85) also appears to have the shape of a nozzle, when said rigid nozzle (85), raceway (14) and windmill (16) are viewed from directly above or directly below;
and, whether viewed from directly above, directly below, to the left, or to the right, the narrowest part of the rigid nozzle (85) is the part closet to the raceway (14) and the widest parts of the rigid nozzle (85) are the parts furthest away from said raceway (14).

9. The machine of claim 1, said raceway (14) being connected to said pedestal (11) by an upper raceway holding post (45) which connects between the pedestal (11) and the raceway (14) at the highest part of said raceway (14); and a lower raceway holding post (44) which connects between the pedestal (11) and the raceway (14) at the lowest part of said raceway (14).

10. The machine of claim 1, further comprising at least one of:
a raceway support cable (50) that begins in said turbine shaft crown (54) and ends by connecting to said raceway (14) and that provides structural support to said raceway (14); and,
a raceway support strut (51) that extends from said turbine shaft crown (54) to said raceway (14) and provides structural support to said raceway (14).

11. A machine for generating electricity comprising the following components:
a raceway (14); where such raceway is a ring with a large hollow space in its center, where said large hollow space is the turbine blade area (10); and is open all the way through the raceway (14);
a rotor (39) further comprising one or more partitioned blades (15);

a main turbine shaft (53);
said main turbine shaft (53) further comprising a turbine shaft back end (52) and a turbine shaft front end (61);
said main turbine shaft (53) protruding through said raceway (14) so that the turbine shaft back end (52) is to a back of the raceway (14) and the turbine shaft front end (61) is to a front of the raceway (14);
one or more primary generators (25) capable of generating electricity;
one or more blade coordination cables (22) extending out of said turbine shaft back end (52);
one or more blade coordination motors (23), each of which is contained within said turbine shaft back end (52) and connected to one or more of said coordination cables (22);
said partitioned blades (15) each further comprising:
a blade tip (58);
a blade spar (19) which extends outward from said main turbine shaft (53) towards an outer edge of said turbine blade area (10);
one or more ribs (18) which protrude outward from said blade spar (19);
one or more blade sub-sections (17), each of which is attached to one of the ribs (18);
each said rib (18) being coated with semi-flexible foam (20) which is further covered by a flexible epoxy coating (21); such coating offering some protection for said rib (18); while also allowing movement of blade sub-sections (17) that are attached to said rib (18) relative to the rib (18);
said blade coordination motors (23) each controlling one of the coordination cables;
and said coordination cables (22) each being attached to one of the ribs so that said blade coordination motors (23) can control said ribs (18) through said coordination cables (22) and can control the positioning of said blade sub-sections (17) via said ribs (18);
said machine further comprising a processor capable of controlling said blade coordination motors (23) and, in response to data about a wind direction and strength, causing said blade coordination motors (23) to move said coordination cables (22), thus changing the "angle of attack" of said blade sub sections (17);
the connection between said blade spars (19) and said main turbine shaft (53) causing said main turbine shaft (53) to generate mechanical energy when the blade sub-sections (17) move in response to wind hitting them;
said machine further comprising a rotor assembly sleeve (55) connected to said turbine shaft (53) so that mechanical energy is transferred from said turbine shaft (53) to said rotor assembly sleeve (55) when said mechanical energy is generated by said turbine shaft;
and mechanical energy can be transferred from said blade spars (19) to said rotor assembly sleeve (55) when said blade spars (19) rotate;
said machine further comprising a rotating power transfer sleeve (27) connected to said rotor assembly sleeve so that mechanical energy may be transferred from said rotor assembly sleeve (55) to said power transfer sleeve (27);
said machine further comprising that said rotating power transfer sleeve (27) is connected to said primary generators (25) so that when energy is transferred from said rotating power transfer sleeve (27) to said primary generators (25), said primary generators (25) generate electricity.

12. The machine of claim 11, further comprising a blade connection cable (59) that surrounds said blade tips (58) and connects to each of said blade tips (58), thus providing further structural support to the machine.

13. The machine of claim 12, further comprising:
a pedestal (11) and a pedestal base (26) and lower pedestal support poles (72) and an intersection node (76); said pedestal (11) extending upward from said pedestal base (26) to said intersection node (76) where it intersects with said main turbine shaft (53), and said pedestal continuing to extend upwards beyond the height of the highest point on said raceway (14);
said intersection node (76) being the point where said pedestal (11) intersects with said turbine shaft (53); said pedestal (11) being connected to said raceway by a lower raceway holding post (44) which connects from said pedestal (11) to the lowest part of said raceway (14) and an upper raceway holding post (45) that connects from said pedestal (11) to the highest part of said raceway, so that said pedestal (11) provides structural support to said raceway (14);
said lower pedestal support poles (72) intersecting with said pedestal (11) and providing structural support to said pedestal (11);
said pedestal base (26) providing structural support to said pedestal;
said rotating power transfer sleeve (27) surrounding that portion of said pedestal (11) which is between the intersection node (76) and the pedestal base (11);
said primary generators being located either within or below said pedestal base (26).

14. The machine of claim 13 further comprising:
a turbine shaft crown (54), raceway support cables (50), raceway support struts (51), blade spar struts (86), a lower bearing (110), an upper bearing (81) and one or more direction control motors (80);
where said turbine shaft crown (54) is on the tip of said turbine shaft (53), next to said turbine shaft back end (52) but further away from said raceway (14) than said turbine shaft back end (52);
where said raceway support cables (50) begin in said turbine shaft crown (54) and extend to said raceway (14); thus providing structural support for said raceway (14) and said turbine shaft (53); where said raceway support struts (51) begin in said turbine shaft crown (54) and extend to said raceway (14), also providing structural support to said raceway (14) and said main turbine shaft (53);
where each of said blade spar struts (86) begins in said turbine shaft front end (61) and extends to a point on one of the blade spars (19) that is between said main turbine shaft (53) and said blade tip (58);
where said upper bearing (81) is at the top of said pedestal (11) and said lower bearing (110) is at the bottom of said pedestal (11);
where said direction control motor (80) can cause said pedestal (11) to rotate along said upper bearing (81) and lower bearing (110), thus causing said main turbine shaft (53) and said raceway (14) to rotate with said pedestal (11);
so that said partitioned blades (15) may be rotated to intercept the largest amount of wind energy that is available.

15. The invention of claim 14, further comprising: upper scaffolding (112) connected to said upper bearing (81), which connects to and provides support to said upper bearing (81) from above, and still allows said pedestal to rotate along said bearing; and, additionally comprising two or more support towers (114), which connect to and provide structural support to said upper scaffolding (112), thus also providing support for the upper bearing (81), pedestal (11) and other components which are attached to said pedestal, and which provide sufficient support to said bearing (81) that said pedestal (11) can remain upright.

16. The invention of claim 14, further comprising;

a hollow shroud (67) surrounding space immediately before and behind the raceway (14) which has a hole for the pedestal (11) to pass through, where said hollow shroud (67) has an opening to the front of the raceway (14), and an opening to the back of the raceway (14), allowing wind to pass through both openings;

where the lower surface of said shroud (67) extends from the raceway to the ground at a 45 degree angle, both to the back of the raceway and to the front of the raceway, but said shroud (67) terminates before it reaches the ground; and the upper surface of said shroud (67) also extends upward from the raceway; both to the back of the raceway and to the front of the raceway at a 45 degree angle, so that both the opening in the shroud (67) to the back of the raceway (14) and the opening in the shroud (67) to the front of the raceway (14) are wider than the raceway (14);

and said machine also comprises shroud unfurling struts (68) which extend from the raceway (14) away from, and to the back of the raceway (14) at approximately a 45 degree angle downwards, throughout the length of the shroud; and, in addition, said shroud unfurling struts (68) extend at a 45 degree angle upwards, and also away from, and to the front of the raceway (14) throughout the length of the shroud; and said shroud unfurling struts (68) also extend from the raceway (14) at approximately a 45 degree angle downwards and to the front of, the raceway (14) and, in addition, said shroud unfurling struts (68) also extend from the raceway (14) at a 45 degree angle upwards, and to the front of, the raceway (14), and said shroud unfurling struts (68) help to keep the shroud (67) deployed in a configuration where the shroud extends outwards to the back of the raceway (14), with its upper surface inclined up at a 45 degree angle, and its lower surface inclined down at a 45 degree angle, and in a configuration where said shroud also extends outwards to the front of the raceway (14) with its upper surface inclined up at a 45 degree angle and its lower edge inclined down at a 45 degree angle, and further comprising shroud unfurling struts (68) that extend from said turbine shaft crown (54) to the back ends of said shroud and from said turbine shaft front end (61) to the front ends of said shroud (67), thus keeping said shroud configured in the desired shape.

17. The invention of claim 14, further comprising;

a nozzle-shaped shroud (100) surrounding space immediately before and behind the raceway (14) which has holes for the pedestal (11) to pass through, and where said nozzle-shaped shroud expands its diameter as it extends out to the back of the raceway (14); and out to the front of the raceway (14); so that said nozzle-shaped shroud (100) appears to have the shape of a nozzle; when the nozzle-shaped shroud (100), and raceway (14) are viewed from the left or the right, and said nozzle-shaped shroud (100) also appears to have the shape of a nozzle, when said nozzle-shaped shroud (100), and raceway (14) and are viewed from directly above or directly below; and, whether viewed from directly above, directly below, to the left, or to the right, the narrowest part of the nozzle shaped shroud (100) is the part closet to the raceway (14) and the widest parts of said nozzle-shaped shroud (100) are the parts furthest away from said raceway (14);

and also comprising nozzle-shaped shroud struts (105) which extend from the raceway (14) outward from the back of the raceway (14) and the front of the raceway (14), and which help to keep the nozzle-shaped shroud (100) deployed in a configuration where it appears to be a nozzle when the nozzle-shaped shroud (100), and raceway (14) are viewed from the left, from the right, from directly up, and from directly down, and where said nozzle-shaped shroud becomes narrower in its portions that are closest to the raceway, to the point that it is pressed against the outer edge of said raceway so that wind flowing through the shroud must pass through the raceway.

18. The machine of claim 14, further comprising that the blade coordination motors (23) are controlled by a computer that is capable of at least one of the following;

a) calculating the optimal positions for the blade sub-sections {17) to capture the maximum possible amount of wind energy;

b) controlling the blade coordination motors (23) so that they control the coordination cables (22) to position the blade subsections (17) to capture the maximum possible amount of wind energy;

c) communicating with a computer connected to an anemometer, to learn the optimal positions for the blade sub-sections (17) to be located in, so that they capture the largest amounts of wind energy available.

19. The machine of claim 14, further comprising that the direction control motor (80) and the primary generators (25) are controlled by a computer which is capable of doing at least one of the following;

a) calculating the optimal orientation for the partitioned blades to (15) to face so that they capture the maximum possible amount of wind energy;

b) controlling the direction control motor (80) so that it turns the pedestal (11) to position the raceway (14) and partitioned blades (15) to capture the maximum possible amount of wind energy;

(c) managing primary generator torque and speed;

(d) controlling each primary generator and managing generator back torque;

(e) converting variable frequency power provided by the primary generators to 60 Hz AC electricity synchronized to grid power from an electrical power grid;

(f) controlling reactive power measured by the primary generators;

(g) controlling an output from each primary generator;

(h) controlling the output of all primary generators together;

(i) sensing wind direction when connected to an anemometer, and using information about the wind direction to calculate the optimal "angle of attack" for each of the blade sub-sections (17) of each of the partitioned blades (15).

20. A machine for generating electricity comprising the following components:

one or more primary generators (25) capable of generating electricity, located at or near ground level; a pedestal (11) capable of rotation;

a means for providing motive power for rotation of said pedestal;

a means of supporting said pedestal so that said pedestal stays upright; a main turbine shaft perpendicular to said pedestal;

said main turbine shaft further comprising a turbine shaft crown (54), a turbine shaft back end (52), and a turbine shaft front end (61);

a rotor assembly sleeve (55) surrounding said main turbine shaft (53);

an intersection node (76) where said main turbine shaft intersects said pedestal;

a rotating power transfer sleeve (27) surrounding a part of said pedestal below said intersection node, and connected to said rotor assembly sleeve (55) so that said rotor assembly sleeve can transmit mechanical energy to said rotating power transfer sleeve;

at least one rotor (39), which comprises at least one partitioned blade (15);

each said partitioned blade (15) further comprising a blade spar (19) that extends from said turbine shaft (53) through a length of said partitioned blade (15) to a blade tip (58) of said partitioned blade;

and each said partitioned blade further comprising;
 a blade spar (19) which extends outward from said main turbine shaft (53) towards outer edge of said turbine blade area (10);
 one or more ribs (18) which protrude outward from said blade spar (19);
 one or more blade sub-sections (17), each of which is attached to one of the ribs (18) and can be moved along said rib;

and said machine further comprising blade spar struts (86) that begin at said turbine shaft front tip (61) and each extend to a point on a each blade spar that is between the turbine shaft (53) and the blade tip (58) which is connected to that blade spar (19);

where said blade spar struts (86) provide structural support to said blade spars (19);

and said machine further comprising a means for moving each of said partitioned blades (15) by moving the blade spar (86) that said partitioned blade is attached to;

and said machine further comprising a means for moving each of said blade sub-sections (17) along the rib(s) that it connects to, when desired by the users, and a power source for said means for moving the blade sub-sections, and said machine also comprising a means for determining wind speed and communicating this information to said means for moving each of said blade sub-sections, so that said blade sub-sections can be positioned to catch the optimal amount of wind energy;

where, in response to wind hitting said partitioned blades (15), said partitioned blades (15) turn, thus imparting mechanical energy to said partitioned blades which then transmits said mechanical energy to said rotor assembly sleeve (55) and said main turbine shaft (53), which transmit said mechanical energy to said rotating power transfer sleeve (27); which in turn transfers said mechanical energy to said primary generators (25), which generate electricity.

\* \* \* \* \*